United States Patent
Perreault et al.

(10) Patent No.: US 6,456,514 B1
(45) Date of Patent: Sep. 24, 2002

(54) ALTERNATOR JUMP CHARGING SYSTEM

(75) Inventors: David J. Perreault, Brookline; Vahe Caliskan, Cambridge, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/558,193

(22) Filed: Apr. 26, 2000

Related U.S. Application Data

(60) Provisional application No. 60/177,752, filed on Jan. 24, 2000, and provisional application No. 60/184,006, filed on Feb. 22, 2000.

(51) Int. Cl.⁷ ............................................. H02M 5/42
(52) U.S. Cl. ............................................. 363/89
(58) Field of Search ............................. 363/55, 56, 84, 363/85, 89, 125, 127, 128

(56) References Cited

U.S. PATENT DOCUMENTS

| | | | |
|---|---|---|---|
| 5,151,641 A | | 9/1992 | Shamoto |
| 5,177,677 A | * | 1/1993 | Nakata et al. ............... 363/89 |
| 5,495,162 A | | 2/1996 | Rozman et al. |
| 5,696,430 A | | 12/1997 | Erdman et al. |
| 5,705,917 A | | 1/1998 | Scott et al. |
| 5,726,557 A | | 3/1998 | Umeda et al. |
| 5,731,693 A | * | 3/1998 | Furmanczyk ............... 323/274 |
| 5,793,625 A | | 8/1998 | Balogh |
| 5,942,818 A | | 8/1999 | Satoh et al. |
| 5,946,202 A | | 8/1999 | Balogh |

FOREIGN PATENT DOCUMENTS

| | | |
|---|---|---|
| DE | 195 19 298 A1 | 11/1996 |
| EP | 0 493 848 A2 | 7/1992 |
| EP | 0 778 662 A1 | 6/1997 |
| EP | 0 849 112 A1 | 6/1998 |
| WO | WO 98/28832 | 7/1998 |

OTHER PUBLICATIONS

Esam Hamid Ismail et al. "Single–Switch 3 Ø PWM Low Harmonic Rectifiers", IEEE Transactions On Power Electronics, vol. 11 No. 2, Mar. 1996, pp. 338–346.

G. Venkataramanan et al. "Variable Speed Operation of Permanent Magnet Alternator Wind Turbines Using a Single Switch Power Convertor", Journal of Solar Energy–Transactions of the Asme vol. 118 No. 4, Nov. 1996, pp. 235–238.

A.R. Prasad et al. "An Active Power Factor Correction Technique for Three–Phase Diode Rectifiers" IEEE Transaction Power Electronics, vol. 6, No. 1 Jan. 1991, pp. 83–92.

\* cited by examiner

Primary Examiner—Matthew Nguyen
(74) Attorney, Agent, or Firm—Daly, Crowley & Mofford, LLP

(57) ABSTRACT

A system for charging a first source from a second source includes an alternating current (ac) voltage source having an internal inductance, a switching power converter coupled to the ac voltage source and the first source, a control circuit coupled to the switching power converter, a connecting system for selectively connecting a positive terminal of the second source to the ac voltage source and a jump charging controller coupled to the control circuit and operative to enable the switching power converter to be used in conjunction with the ac voltage source inductances as a dc/dc converter to charge the first source from the second source.

19 Claims, 28 Drawing Sheets

ALTERNATOR JUMP CHARGING SYSTEM

CROSS-REFERENCE TO RELATED APPLICATIONS

This application claims priority under 35 U.S.C. §119(e) from U.S. provisional application No. 60/177,752 filed on Jan. 24, 2000 and U.S. provisional application No. 60/184,006 filed on Feb. 22, 2000.

FIELD OF THE INVENTION

This invention relates generally to alternator systems and more particularly to alternator systems used in vehicles.

BACKGROUND OF THE INVENTION

As is known in the art, an alternator is an alternating current (ac) output generator. To convert the ac voltage to direct current (dc) for use in charging batteries or supplying dc loads, for example, a rectifier system is used. Sometimes, the alternator is referred to as an ac machine or more simply a machine and the combined generator/rectifier system is referred to as an alternator or an alternator system.

In many cases (including automotive alternators), a diode rectifier is used to rectify the ac voltage produced by the generator. The ac generator can be modeled as a three-phase voltage source and a set of inductors.

In a so-called wound-field machine, the output voltage or current can be controlled by varying the current in a field winding which in turn varies the ac voltage magnitudes. The advantage to this approach is the extreme simplicity and low cost of the system. One particular type of wound field machine is a so-called wound-field Lundell-type alternator. A lundell machine is characterized by the way the rotor/field of the machine is constructed, the details of which are well-known to those of ordinary skill in the art. Significantly, the construction techniques used to manufacture Lundell-type result in an ac machine which is relatively inexpensive but which has a relatively high leakage inductance or reactance. Wound-field Lundell-type alternators are almost universally used in the automotive industry primarily because they are reliable and inexpensive. One problem with wound-field Lundell-type alternators, however, is that the relatively high machine inductance strongly affects the machine performance. In particular, due to the high inductance of the Lundell machine, it exhibits heavy load regulation when used with a diode rectifier. That is, there are significant voltage drops across the machine inductances when current is drawn from the machine, and these drops increase with increasing output current and machine operating speed. Consequently, to deliver substantial current into a low dc output voltage, the ac machine voltage magnitudes have to be much larger than the dc output voltage.

For example, in a typical high-inductance automotive alternator operating at relatively high speed, the internal machine voltage magnitudes are in excess of 80 V to deliver substantial current into a 14 V dc output. This is in contrast with a low-reactance machine with a diode rectifier, in which the dc output voltage is only slightly smaller than the ac voltage magnitudes.

In order to control output voltage or current, a controlled rectifier is sometimes used instead of field control. One simple and often-used approach for controlled rectification is to replace the diodes of a diode rectifier with thyristor devices. For example, as described in J. Schaefer, *Rectifier Circuits, Theory and Design*, New York: Wiley, 1965 and J. G. Kassakian, M. F. Schlecht, and G. C. Verghese, *Principles of Power Electronics*, New York: Addison-Wesley, 1991 thyristor devices can be used in a semi-bridge converter. With this technique, phase control (i.e. the timing of thyristor turn on with respect to the ac voltage waveform) is used to regulate the output voltage or current. One problem with this approach, however, is that it can be relatively complex from a control point of view. This is especially true when the alternator must provide a constant-voltage output.

Alternatively, rather then using phase control, control is sometimes achieved using switched-mode rectification. With the switched-mode rectification technique, fully-controllable switches are used in a pulse width modulation (PWM) fashion to produce a controlled dc output voltage from the ac input voltage. This approach, which typically utilizes a full-bridge converter circuit, often yields high performance at the expense of many fully-controlled PWM switches and complex control circuits and techniques.

One relatively simple switched-mode rectifier that has been employed for alternators attached to wind turbines is described in an article entitled "Variable Speed Operation of Permanent Magnet Alternator Wind Turbines Using a Single Switch Power Converter," by G. Venkataramanan, B. Milkovska, V. Gerez, and H. Nehrir, *Journal of Solar Energy Engineering—Transactions of the ASME*, Vol. 118, No. 4, November 1996, pp. 235–238. In this approach, the alternator includes a rectifier comprising a diode bridge followed by a "boost switch set" provided from a controlled switch (such as a MOSFET) and a diode. The switch is turned on and off at a relatively high frequency in a PWM fashion. This approach is utilized along with PWM switching generated by a current-control loop to simultaneously control the output current and turbine tip speed of a permanent magnet alternator. The approach is specifically applied to a low-reactance (i.e. low-inductance) permanent-magnet ac machine where the battery voltage is higher than the ac voltage waveform. It should be noted that the rectifier system is topologically the same as the Discontinuous Conduction Mode (DCM) rectifier described in an article entitled "An Active Power Factor Correction Technique for Three-Phase Diode Rectifiers," by A. R. Prasad, P. D. Ziogas, and S. Manias, the *IEEE Trans. Power Electronics*, Vol. 6, No. 1, January 1991, pp. 83–92, but the operating mode and control characteristics of the single switch power converter and DCM rectifier are very different.

Another controlled rectifier approach for alternators is described in U.S. Pat. No. 5,793,625, issued Aug. 11, 1998. This patent describes a circuit which utilizes the application of boost mode regulator techniques to regulate the output of an ac source.

The source inductance becomes part of the boost mode circuit, thus avoiding the losses associated with the addition of external inductors. When a three-phase alternator is the power source, the circuit comprises a six diode, three-phase rectifier bridge, three field effect transistors (FETs) and a decoupling capacitor. The three FETs provide a short circuit impedance across the output of the power source to allow storage of energy within the source inductance. During this time, the decoupling capacitor supports the load. When the short circuit is removed, the energy stored in the inductances is delivered to the load. Because the circuit uses the integral magnetics of the ac source to provide the step-up function, a relatively efficient circuit is provided. The duty cycle of the switches (operated together) is used to regulate the alternator output voltage or current. The rectifier can thus be used to regulate the output voltage and improve the current waveforms for low-reactance machines that would otherwise operate with discontinuous phase currents.

While regulating output voltage or current with a boost circuit of this type may be useful in permanent magnet alternators having relatively low inductance characteristics, this method is not useful with alternators having a relatively large inductance characteristic and a wide operating speed range such as in wound-field Lundell-type alternators for automotive applications.

To understand this, consider that in a system which includes an alternator coupled to a boost rectifier, the output voltage is fully controllable by the boost rectifier when the internal machine voltages are the same magnitude or lower than the dc output voltage as described, for example, in the above referenced Venkataramanan paper. However, if the internal machine voltages become significantly larger than the desired dc output voltage, then the output voltage cannot be regulated by the boost rectifier independent of load without inducing unacceptably high currents in the machine. The typical automotive Lundell alternator presents this problem.

At the present, high-reactance Lundell-type alternators with diode rectifiers and field control are widely used in the automotive industry. Moreover, there is a very large infrastructure dedicated to the manufacture of Lundell-type alternators. However, design of these alternators is becoming increasingly more difficult due to continually rising power levels required in vehicles and in particular required in automobiles.

As is also known, the average electrical load in automobiles has been continuously increasing for many years. The increase in electrical load is due to the demand to provide automobiles and other vehicles with increasingly more electronics and power consuming devices such as microprocessors, electric windows and locks, electromechanical valves, and electrical outlets for cell phones, laptop computers and other devices. Such additional electronics results in a need for more electrical energy in automobiles and other vehicles.

Because of this increase in electrical load, higher power demands are being placed on automotive alternator systems. Furthermore, the increasing power levels have motivated the adoption of a new higher distribution voltage in automobiles to augment and/or replace the current 14 V distribution system. In some cases, a single high-voltage electrical system may likely be used (e.g. a 42 volt electrical system). In other cases, a dual-voltage electrical system may be used which includes a first relatively high-voltage system (e.g. a 42 V electrical system) and a second relatively low-voltage system (e.g. a 14 V electrical system.) The high-voltage electrical system will be used to power vehicle components which require a relatively large amount of power such as a starter motor of a vehicle. When retained (in the dual-voltage case), the low-voltage system will be used to power vehicle components that benefit from a low-voltage supply such as incandescent lamps and signal-level electronics.

A dual- or high-voltage system having a starter motor coupled to a high-voltage bus requires a charged high-voltage battery to start. In cases where the high-voltage battery is not fully charged or is depleted, it would be desirable to be able to charge the depleted high-voltage battery from a low-voltage source in order to provide "jump-start" capability for dual/high voltage systems. In an automobile which includes only a single high-voltage system, one may desire to transfer energy from a low-voltage power source, battery or alternator of a different vehicle to the high-voltage system. In a dual-voltage system, one may desire to transfer energy from a low-voltage battery of the dual-voltage system to the high voltage battery of the dual-voltage system or from the low-voltage battery or alternator of a different vehicle or other low-voltage source to the high voltage battery of the dual-voltage system.

It would, therefore, be desirable to provide a means by which the power output capability of an alternator can be increased. It would also be desirable to provide an alternator which is capable of efficient operation at a plurality of different voltage levels.

It would be further desirable to provide an alternator which is capable of operating in a dual voltage automobile. It would be still further desirable to provide a system and technique for transferring energy from a low-voltage battery of a first vehicle or from an alternator of a second different vehicle or other source to a high-voltage bus of the first vehicle.

SUMMARY OF THE INVENTION

In accordance with the present invention, a system for charging a battery at the output of the switched-mode rectifier includes means for selectively connecting the positive terminal of a charging source (which may be a low-voltage source) to the machine neutral point. This may be done via a connector or a switch (such as a mechanical switch, relay, or semiconductor switch), or by another similar means. The negative terminal of the charging source is connected to system ground (as is the negative terminal of the high-voltage battery). In this configuration the ac machine inductances in conjunction with the switched-mode rectifier can be used as a dc/dc converter to charge the high-voltage battery from the charging source. In one embodiment, the switched mode rectifier includes a plurality of metal oxide semiconductor field effect transistors (MOSFETs). When the MOSFETs are turned on, the current in the ac machine inductances increases, drawing energy from the low-voltage charging source and storing it in the machine inductances. When the MOSFETs are turned off, some of this energy plus additional energy from the charging source are transferred to the high-voltage battery through the diodes. The high-voltage battery may be charged from a low-voltage charging source (for jump-starting purposes, for example) using this method.

It should be recognized that this approach may be utilized in dual-voltage systems as well. In the case of a dual-voltage system, the charging source may be the low-voltage battery of the same vehicle, or it may be supplied from a different vehicle or source. Again, a means is provided for selectively connecting a neutral of the ac machine to the desired charging source. In a dual-voltage system charging from its own low-voltage battery, this connection may be conveniently provided by a relay connecting the machine neutral to the positive terminal of the low-voltage battery, for example.

In accordance with a further aspect of the present invention, a method for charging a battery at an output of a switched-mode rectifier includes the steps of connecting the positive terminal of a charging source to a neutral point of an ac machine, connecting the negative terminal of the charging source to system ground (it is assumed that the negative terminal of the high voltage source is already connected to ground), increasing the current in the ac machine to draw energy from the charging source and storing the energy in the machine inductances and transferring the energy plus additional energy from the charging source to the high-voltage battery. With this method, the high-voltage battery may be charged from a low-voltage source for jump-starting purposes, for example.

The connection between the positive terminal of the low voltage source and the ac machine neutral point may be provided via a connector or a switch (such as a mechanical switch, relay, or semiconductor switch), or by another similar means. The current in the ac machine may be increased to draw energy from the low-voltage source by providing a low impedance path between the output terminals of the alternator and system ground. This may be accomplished, for example, by turning on switches in a switched mode rectifier coupled to the ac machine.

In this configuration, the ac machine inductances in conjunction with the switched-mode rectifier can be used as a dc/dc converter to charge the high-voltage battery from the charging source. When the switches of the switched-mode rectifier, which may be provided as MOSFETs for example, are turned on, the current in the machine inductances increases, drawing energy from the low-voltage source and storing it in the machine inductances. When the switches are turned off, some of this energy plus additional energy from the charging source are transferred to the high-voltage battery through the diodes.

It should be recognized that this approach may be utilized in dual-voltage systems as well. In the case of a dual-voltage system, the charging source may be the low-voltage battery of the same vehicle, or it may be supplied from a different vehicle or source. Again, a means is provided for selectively connecting the alternator machine neutral to the desired charging source. In a dual-voltage system charging from its own low-voltage battery, this connection may be conveniently provided by a relay connecting the machine neutral to the positive terminal of the low-voltage battery, for example.

It should also be recognized that this approach may be used in systems employing rectifier types other than a boost rectifier, such as those described below. With other rectifier types, the charging source voltage may in fact be the same or larger in magnitude than the high-voltage battery at the switched-mode rectifier output. It should also be recognized that connection points other than the machine neutral may be used with this approach. Again, in these cases, the alternator inductances and switched-mode rectifier may be used as a dc/dc converter to provide controlled charging from the charging source to the high-voltage battery.

In accordance with a still further aspect of the present invention, an alternator system having an alternating current (ac) voltage source controlled by a field current regulator and an internal inductance includes a switched-mode rectifier coupled to the ac voltage source, a switched-mode rectifier (SMR) control circuit coupled to the switched-mode rectifier and a speed sensor coupled to the SMR control circuit.

With this particular arrangement, an alternator system capable of increased alternator system power output is provided. The speed sensor senses a frequency or operating speed of the ac voltage source and provides a signal representative of the frequency or speed to the SMR control circuit. In response to the frequency or speed information provided thereto, the SMR control circuit provides a duty ratio signal to the switched-mode rectifier which causes the switched-mode rectifier to operate with a particular duty cycle. The switched-mode rectifier duty cycle is thus selected based upon the frequency or speed of the ac voltage source. When the switched-mode rectifier is operated in this manner, the alternator system achieves levels of power and performance that are higher than those conventionally achieved.

The switched-mode rectifier operates at a duty cycle selected to provide a controlled transformation of voltage and current between terminals of the ac voltage source and output terminals of the alternator system and converts an ac voltage from the ac voltage source to a direct current (DC) voltage. In this manner the switched-mode rectifier transforms the voltage at the output of the ac voltage source such that the switched-mode rectifier stage extracts relatively high levels of power and performance from the ac voltage source.

Because of the load regulation in a high reactance machine, for maximum field current, the output power that the ac machine delivers is a function of the speed of the machine and the effective voltage seen by the ac machine. For a given speed, there is a single effective alternator voltage at which maximum power output will be achieved (as illustrated in the curves of FIG. 3 discussed below). The switched-mode rectifier provides a controlled transformation of voltage and current between the terminals of the alternator machine and the alternator system output. The transformation is controlled by a duty ratio d. In the case where the switched-mode controller includes a boost rectifier circuit, the machine sees a local equivalent voltage $v_x$ that is $(1-d)$ times the output voltage, and the output receives a current that is $(1-d)$ times the machine current, so that the boost rectifier appears as an ideal transformer with turns ratio $1-d$. By controlling the duty ratio of the switched-mode rectifier as a function of speed (rpm) one can ensure that the alternator machine can always achieve its maximum power output independent of the fixed alternator system output voltage. It should be appreciated that the speed sensor can sense any parameter or combination of parameters related to ac machine speed (e.g. engine speed, frequency, alternator speed, frequency, alternator back emf, etc.) and provide an appropriate signal to the SMR control circuit.

At the same time the present invention provides a circuit that is relatively simple and inexpensive. The alternator system can also include a field controller and a field current regulator coupled to the ac voltage source that controls the ac voltage source magnitude. The field control can be used as a primary means for regulating output voltage or current in the wound-field alternator. The switched-mode rectifier stage is controlled and acts as a second control handle to extract relatively high levels of power and performance from the alternator.

In one embodiment the alternator system can optionally control the switched-mode rectifier duty ratio as a function of both the alternator speed and the field current magnitude. To achieve maximum power from the machine (at full field current) it is sufficient to control the duty ratio as a function of speed. By controlling the duty ratio as a function of both speed and field current, it is possible to achieve improved operation (e.g. higher efficiency) at partial load in addition to the improvement in maximum output power. It should be appreciated that the field current can be determined by any parameter or combination of parameters related to field current, e.g. field current, average field voltage, field controller duty ratio, alternator back emf, field winding magnetic field strength, etc. It should also be appreciated that the switched-mode rectifier duty ratio can be controlled based on measurements related to joint functions of field current and speed, such as alternator back emf (which is related to the product of alternator speed and field current).

In a different embodiment, the alternator system can optionally control the switched mode rectifier duty ratio as a f-unction of the machine back emf, which is related to the product of alternator speed and field current. Controlling the switched-mode rectifier as a function of machine back emf will ensure that the alternator machine can always achieve its maximum power output independent of the fixed alternator system output voltage, and will also provide high efficiency operation at output power levels below maximum. A machine back emf sensor (which may comprise a sense winding and processing electronics or other means of measuring or estimating the back emf) may be provided in place of or in addition to the speed sensor in this embodiment.

In one embodiment, the alternator system can optionally include a fault protection controller coupled to the SMR control circuit. The fault protection controller operates under fault conditions (e.g. load dump), and overrides the other controllers in the alternator system based on output voltage when a load dump occurs.

In operation, in response to detection of a fault condition by the fault protection controller, (e.g. when a significant over-voltage is detected at the output terminals of the alternator system) the fault protection controller overrides both the field and switched-mode rectifier controllers such that the field current is driven down and the switched-mode rectifier limits the load dump transient at the output. In this manner, the fault protection controller provides a means for implementing load dump protection. Thus, inclusion of the fault protection controller provides an alternator system having a greater degree of circuit protection than can be achieved with a conventional diode rectifier.

In one embodiment the alternator system can optionally include a connecting system for selectively connecting the positive terminal of a charging source to the machine neutral point, along with a jump charging controller coupled to the SMR control circuit. This enables the switched-mode rectifier to be used in conjunction with the alternator machine inductances as a dc/dc converter to charge the battery at the output of the switched-mode rectifier from the charging source. The inclusion of these elements provides an important improvement in the alternator system functionality over what is achieved in conventional systems.

The circuit of the present invention is well suited to use with high-reactance wound-field alternators, including automotive Lundell-type alternators and therefore finds immediate applicability in use with automotive alternators. The present invention also finds use in any application which requires an alternator including but not limited to the petroleum exploration industry, where a downhole alternator, connected to a turbine driven by drilling mud, is used as a downhole power source in directional drilling operations. The invention also finds use in generators for marine and aerospace applications, portable generators and backup power supplies.

With the present invention, relatively high power levels can be achieved within the existing manufacturing framework and with existing machine sizes at relatively low cost. Furthermore, the so-called load dump problem associated with Lundell and other wound field types of alternators is overcome by the addition of some control circuitry (e.g. a fault protection controller coupled to sense voltage levels at the output or at other locations of the alternator system), a relatively small change in the rectifier stage (e.g. coupling of the rectifier stage to the fault protection controller) and minor adjustments in the machine design so that the peak of the machine's output power versus output voltage curve for constant speed with diode rectification matches the desired output voltage at a desired cruising speed, rather than at idle.

Changes to the machine, for example, could be implemented by providing the ac machine having a particular number of turns and a particular wire gauge selected such that at a desired cruising speed the peak of the ac machine's output power vs. dc output voltage curve for diode rectification occurs at the desired output voltage. Those of ordinary skill in the art will appreciate of course that other parameters of the ac machine in addition to or in place of the number of turns and wire gauge may also be appropriately selected to achieve desired operation of the ac machine. Thus, relatively simple modifications to the winding of a conventional alternator can be made for good operation in accordance with the present invention at any desired output voltage.

The steps to wind of the alternator for a desired voltage are as follows: first, select a suitable cruising speed to design for and second, choose the number of alternator stator winding turns such that the peak of the output power versus output voltage curve (for diode rectification) at the design speed reaches its maximum at the desired output voltage. It should be noted that there are other more sophisticated modifications that can be made to an alternator for good operation in accordance with the present invention, such as reoptimizing the magnetic and thermal design of the alternator.

In addition to trends towards higher power in automotive alternators, there will be a need for high-power automotive alternators which generate power at higher voltages (e.g. at a voltage of 42 volts (V) instead of 14 V). With the present invention, by changing only the rectifier stage and control circuits even present 14 V ac machine designs are suitable for high-power operation at 42 V output. That is, by merely replacing the diode rectifier stage of a conventional alternator system with the switched-mode rectifier of the present invention, changing the field controller to one that takes input from a fault or load-dump protection controller, and replacing the control circuitry with appropriate new controls as described above, present machines designed for operation at 14 V can operate at 42 V. It should be appreciated that with such modifications operation can be achieved at other voltages including but not limited to 42 V.

With such a relatively simple change, it may be possible to manufacture both 14 V and 42 V versions of an alternator on the same manufacturing line. Thus, the new invention is timely for meeting the demands of higher power and higher voltage alternators in the automotive industry while remaining within the existing manufacturing framework and overcoming the present day load dump transient problem.

It should be noted that in prior art systems employing a switched-mode rectifier, the rectifier is used to regulate the output voltage. This is in contrast to the operation of an alternator system which operates in accordance with the present invention in which field control is used to regulate the output voltage and the switched-mode rectifier functions to provide "load matching" between the machine and the load so that much higher levels of power can be extracted from the alternator than could be achieved with a diode rectifier.

The differences between such prior art systems and the system of the present invention become clear when one considers the details of the control circuitry. In a prior-art system using a switched-mode rectifier, the alternator system output voltage (or current) is an input to the controller of the switched-mode rectifier. In accordance with the present invention, however the frequency or speed of the ac machine is provided to the controller of the switched-mode rectifier. Thus, the SMR need only utilize the frequency or speed of the ac machine to determine the duty ratio of the switched-mode controller. A field controller and a field current regulator or other output voltage control means coupled to the ac machine may be used to primarily regulate the output voltage.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

As noted above, those of ordinary skill in the art sometimes refer to the ac machine itself as an alternator while at other times those of ordinary skill in the art refer to the combination of the ac machine coupled to a rectifier circuit also as an alternator. To promote clarity in the text, the term "alternator system" will be used herein to describe a system which includes an ac generator portion and a rectifier portion. The ac generator portion may also be referred to as an "ac machine," an "ac generator," a "generator" or an "alternator" while the rectifier portion of an alternator system will be referred to herein as a "rectifier" or a "rectifier circuit." The term "ac voltage source" is intended to cover any type of source which can be used with the present invention including but not limited to an alternator.

In the description hereinbelow, reference is sometimes made to an ac machine having a particular number of phases. Those of ordinary skill in the art will appreciate, of course, that the concepts described herein apply equally well to ac machines having any number of phases including single phase or any poly-phase ac machines. Reference is also sometimes made herein to switched-mode rectifiers and SMR controllers having a particular topology. Those of ordinary skill in the art will appreciate that the principles of the present invention can be implemented using a variety of switched-mode rectifier topologies and that those presented herein are only examples and should not be construed as limiting. It should be appreciated that any switched-mode rectifier topology capable of implementing the desired control function can be used.

Reference is also sometimes made herein to alternators or alternator systems operating at a particular voltage level or within a range of voltage levels such as 14 volts (V) or 42 V. it should be understood that the principles of the present invention apply equally well to alternators and alternator systems having any voltage levels.

Figure 1:
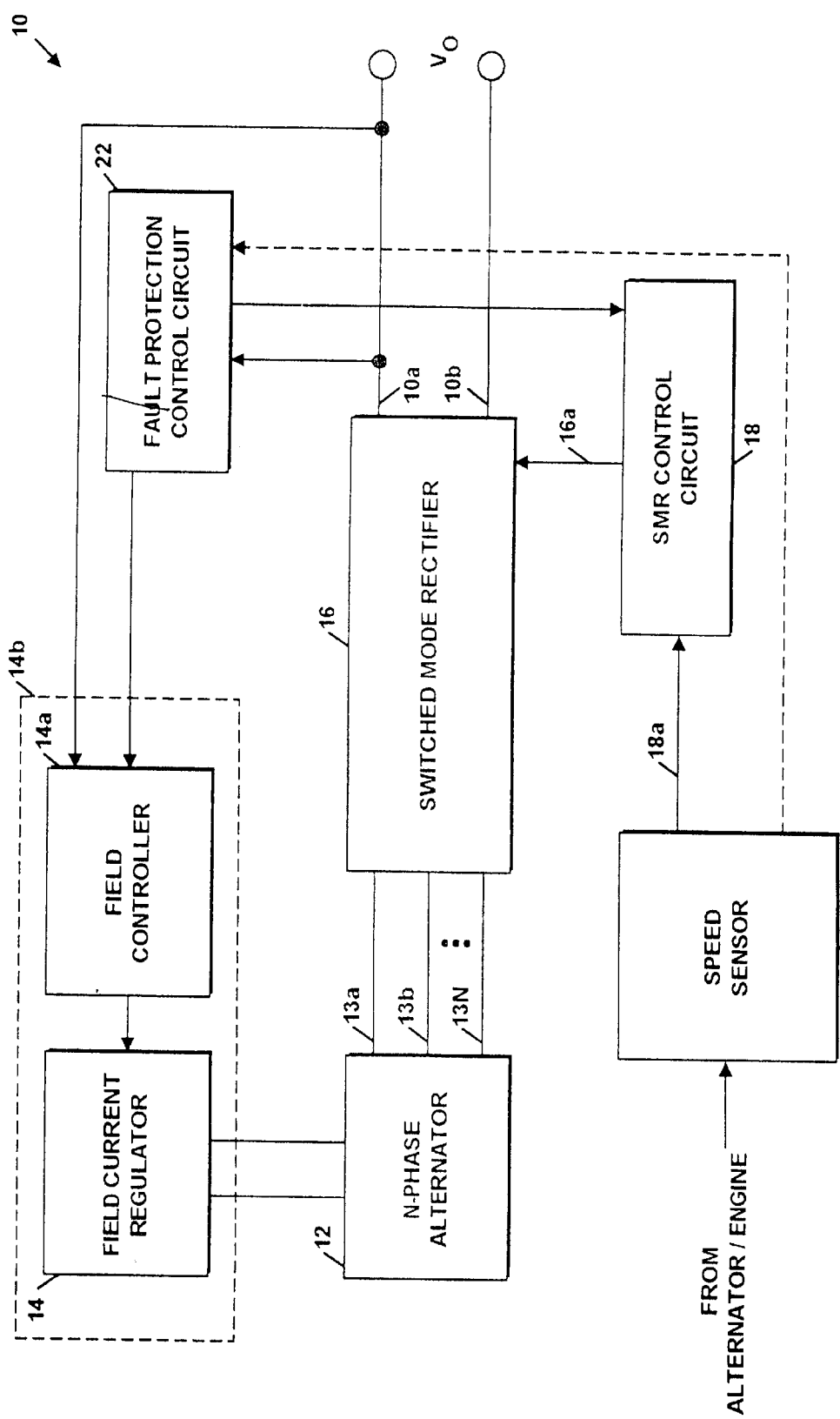
FIG. 1 is a block diagram of an alternator system.

Referring now to FIG. 1, an alternator system 10 having output terminals 10a, 10b includes a three phase alternator 12 having a field current regulator 14 and a switched-mode rectifier 16 coupled thereto. A field control circuit 14b regulates the output voltage at terminals 10a, 10b of the alternator system. The field control circuit includes a field current regulator 14 and a field controller 14a. The field current regulator 14 receives control signals from a field controller 14a and functions to regulate the output voltage at terminals 10a, 10b of the alternator system 10. The alternator 12 provides power along three signal paths 13a, 13b, 13c to the switched-mode rectifier circuit 16. The switched-mode rectifier receives the power from the alternator 12 and also receives a duty cycle control signal along path 16a from a switched-mode rectifier (SMR) control circuit 18. The SMR control circuit 18 receives sensing signals at an input terminal 18a from a speed sensor 20 which may be provided as a tachometer for example. The speed sensor 20 senses the engine speed or alternator speed and provides a frequency or speed signal to the SMR control circuit 18 along a signal path 18a. It should be appreciated that the speed sensor can sense any parameter or combination of parameters related to ac machine speed (e.g. engine speed, frequency, alternator speed, frequency, alternator back EMF or back EMF frequency, or any quantity from which the appropriate information can be observed or estimated) and provide an appropriate signal to the SMR control circuit. Based upon the frequency or speed of the alternator 12 the control circuit 18 provides duty signals along signal path 16a to control the operation (e.g. a duty ratio) of the switched-mode rectifier 16.

The switched-mode rectifier 16 functions to provide "load matching" between the alternator 12 and a load so that the power level which can be extracted from the alternator 12 is higher than that which could be achieved with a diode rectifier, for example.

The speed of the alternator 12 provided from speed sensor 20 corresponds to the input signal provided to the SMR control circuit 18 which causes the switched-mode rectifier 16 to operate at a particular duty ratio.

The output voltage is coupled to a fault protection circuit or controller 22 and also to the field controller 14a. The fault protection controller 22 operates under fault conditions (e.g. load dump), and overrides the other controllers 14a, 18 based on output voltage when a load dump occurs. The fault protection controller 22 thus provides a means for implementing load dump protection. Thus, inclusion of the fault protection controller provides the alternator system 10 having a greater degree of circuit protection than can be achieved with a conventional diode rectifier.

In response to detection of a fault condition by the fault protection controller, (e.g. when a significant over-voltage is detected at the output terminals of the alternator system) the fault protection controller provides control signals which override control signals provided from both the field and switched-mode rectifier controllers. The control signals from the fault protection control circuit cause the field regulator to drive the field current down and cause the switched-mode rectifier to limit the load dump transient at the output. That is, in the event of a load dump fault condition the fault protection controller overrides the field current and duty ratio commands of the controllers 14a, 18 such that the field current is driven down and the switched-mode rectifier limits the load dump voltage transient at the output terminals 10a, 10b. It should be noted that the fault protection controller only overrides the other controls for a limited time during a fault.

In operation, the field current regulator 14 act as a primary means for regulating output voltage or current provided from the alternator system 10. The field current regulator will also de-energize the field upon command from the fault protection control circuit. While the field current regulator 14 provides primary control, the switched-mode rectifier stage 16 is used as a second control handle to extract levels of power and performance from the alternator 12 which are relatively high compared with power and performance levels achieved using prior art systems. The SMR control circuit 18 receives an input signal from the speed sensor 20 (which may, for example, be provided as a tachometer) and in response to the speed sensor signal, the SMR controller sets the SMR duty ratio so that the maximum power curve is followed as a function of speed (e.g. see curve 42 in FIG. 3). Additionally, in the special case of a load dump (significant over voltage at the alternator system output) being detected, the SMR control circuit will take duty ratio commands from the fault protection control circuit to limit the transient seen at the output.

Control of the switched-mode rectifier stage 16 by the fault protection control circuit provides a greater degree of circuit protection than can be achieved with a conventional diode rectifier. Thus, the switched-mode rectifier 16 provides a valuable degree of additional control over the alternator system output voltage $V_o$, while remaining relatively simple and inexpensive.

As described herein, the approach of using the field current regulator 14 as a primary means for regulating alternator system output voltage or current and the control of the switched-mode rectifier stage 16 as a second control handle to extract levels of power and performance from the alternator 12 results in a system which can provide increased performance benefits for wound-field alternators having relatively high-reactance values, such as the automotive Lundell-type alternators that are in widespread use today in automobiles.

Thus, unlike prior art systems such as those described in U.S. Pat. No. 5,793,625 entitled Boost Converter Regulated Alternator issued August 11, 1998 and in an article by G. Venkataramanan, B. Milkovska, V. Gerez, and H. Nehrir, entitled "Variable Speed Operation of Permanent Magnet Alternator Wind Turbines Using a Single Switch Power Converter," *Journal of Solar Energy Engineering—Transactions of the ASME*; Vol. 118, No. 4, November 1996, pp. 235–238, the system of the present invention utilizes wound-field alternators and field control as a primary means for regulating alternator system output voltage or current and the switched-mode rectifier stage 16 as a second control means for achieving load matching to extract higher levels of power from the alternator and for limiting alternator output voltage during a fault transient.

It should also be appreciated that it has not heretofore been recognized that an SMR could be used for the purpose of "load matching" to extract higher levels of power from an alternator.

It should be appreciated that, the control circuitry associated with the present invention can be represented as three sections. One control section (the field current regulator controller) receives the output voltage as an input and regulates the output voltage by commanding adjustments to the field current. A second control section (the switched-mode rectifier controller) receives speed as an input and performs the "load matching" for maximizing power capability by adjusting the duty ratio. The third section (the fault protection control circuit) receives the output voltage (and possibly speed as well) as an input. In the event of a load dump fault condition the fault protection control circuit overrides the field current and duty ratio commands of the other two controllers (such that the field current is driven down and the switched-mode rectifier limits the load dump voltage transient at the output). The fault protection control circuit takes effect for only a limited time during a fault. As can be seen, in this implementation there is only interaction between the field current regulator and the SMR controller inasmuch as they both take control inputs from the load dump protection controller during a load dump fault; the rest of the time the field current regulator and SMR controller act independently.

As will be described below in conjunction with FIG. 1B, in some embodiments it may be desirable to use more sophisticated implementations in which the field current and the duty ratio are jointly controlled as a function of output voltage and speed. One may then be able to achieve higher performance (such as higher efficiency) over some parts of the operating range while still achieving both the high maximum power transfer capability and output voltage regulation.

As will be described below in conjunction with FIG. 1C, in some embodiments it may be desirable to use a more sophisticated implementation in which the switched-mode rectifier duty ratio is controlled as a joint function of speed and field current. Using this approach one can obtain load matching at all operating points, resulting in higher performance (e.g. high efficiency) at partial load while still achieving the high maximum power transfer capability.

As will be described below in conjunction with FIG. 1D, in some embodiments it may be desirable to use an implementation in which the switched-mode rectifier duty ratio is controlled as a function of machine back emf (which is related to the product of speed and field current). Controlling the switched-mode rectifier as a function of machine back emf one can obtain load-matching at all operating points, resulting in higher performance (e.g. high efficiency) at partial load while still achieving the high maximum power transfer capability.

Figure 1A:
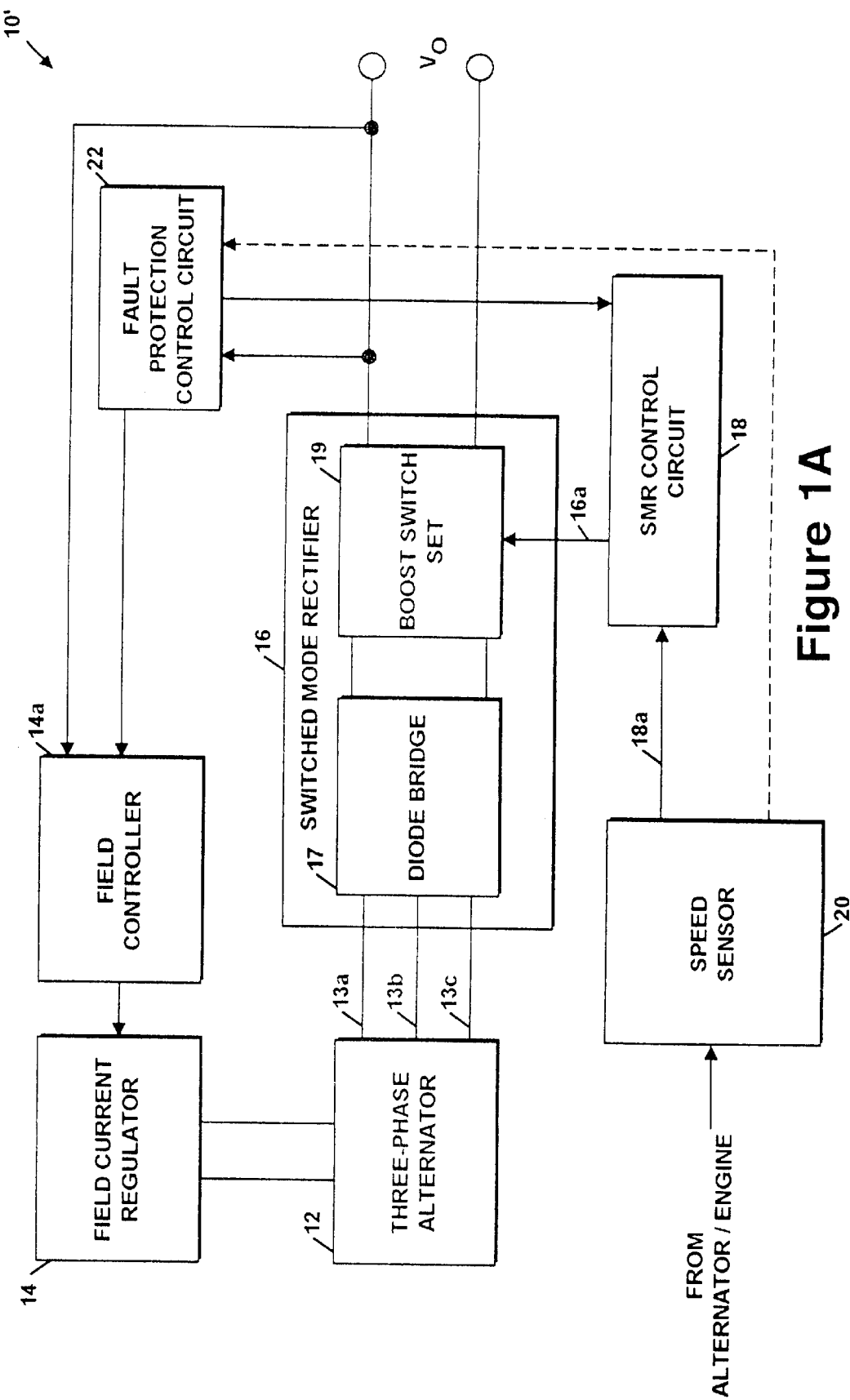
FIG. 1A is a block diagram of an alternator system.

Referring now to FIG. 1A, an alternator system 10' which may be similar to alternator system 10 described above in conjunction with FIG. 1 is shown having a switched-mode rectifier circuit 16' comprising a diode bridge 17 and a boost switch set 19 coupled to the diode bridge 17. The control circuit 18 receives signals from the speed sensor 20 as described above in conjunction with FIG. 1 and provides duty signals along path 16a to control the operation of the boost switch set 19. The duty cycle of the boost switch set 19 is selected based on the desired output voltage and speed of the alternator 12 such that the alternator system can provide relatively high levels of output power over a range of alternator speeds, Referring now to FIG. 1B, the alternator system 10 described above in conjunction with FIG. 1 is shown in an alternate embodiment which includes a state regulator 23 coupled between the field controller 14a (or alternatively the field current regulator 14) and the SMR control circuit 18 (or alternatively the switched-mode rectifier 16). Coupling of the field controller 14A and the SMR control circuit 18 can be advantageous. For example, by making the duty ratio of the switched-mode rectifier 16 a function of both the speed and the field current, one can achieve the same load matching and power improvement for full field while also achieving higher efficiency over a desired operating range of speed and load current or some other design objective. In one implementation of such an approach, the field current command could be determined to regulate the output voltage, while the SMR duty ratio could be selected for optimal load matching with respect to the instantaneous field current command (or field current). In another implementation of such an approach, the field current command and the SMR duty ratio could be selected to jointly control the output voltage and provide load matching while achieving high system efficiency Referring now to FIG. 2, an alternator system 24 includes a wound-field alternator 25 with field control provided by a field current regulator 26 coupled to a field controller 26a. The alternator 25 may be of a high-reactance type such as a Lundell alternator. In this particular embodiment, the alternator 25 is modeled as a three-phase y-connected alternator having a stator modeled as a set of induced voltages vsa, vsb, vsc in series with the alternator leakage inductances Ls. Those of ordinary skill in the art will appreciate of course that for purposes of the present invention, it does not matter if the alternator is delta or Y connected. The principles of the present invention apply equally well regardless of the particular manner in which the alternator is connected and those of ordinary skill in the art would understand how to model the alternator 25 in accordance with the particular manner in which it is connected. The three phases each have a voltage source, labeled VSA, VSB and VSC that are connected to a common neutral node, N. Each of the three phases of the alternator 22 has a relatively large associated inductance designated as Ls. It should be appreciated that while the alternator also includes a resistance, it is not necessary to account for the resistance to gain an understanding of the invention.

A switched-mode rectifier 27 coupled to the alternator 25 includes a diode bridge 28 coupled to the alternator 25 as shown. The diode bridge includes a plurality of diodes 28a–28f which may be provided as conventional diodes typically used in bridge circuits coupled to an alternator. Coupled to the diode bridge is a boost switch set or boost stage 30 comprising a controlled switch 32 and a diode 34.

It should be noted that the voltage Vx is not only a dc voltage, but it also has a high (switching) frequency ac component. In general, the "local average" of Vx is used to refer to its dc (or low-frequency) component. Because of the large leakage inductances, the alternator 25 reacts primarily to the local average of Vx and not the switching frequency components. The switch 32 may be provided, for example, as a metal oxide semiconductor field effect transistor (MOSFET). Those of ordinary skill in the art will appreciate how to select the MOSFET switches having appropriate switch characteristics for each particular application. Those of ordinary skill will also appreciate that switches other than MOSFET switches may be used.

Figure 2:
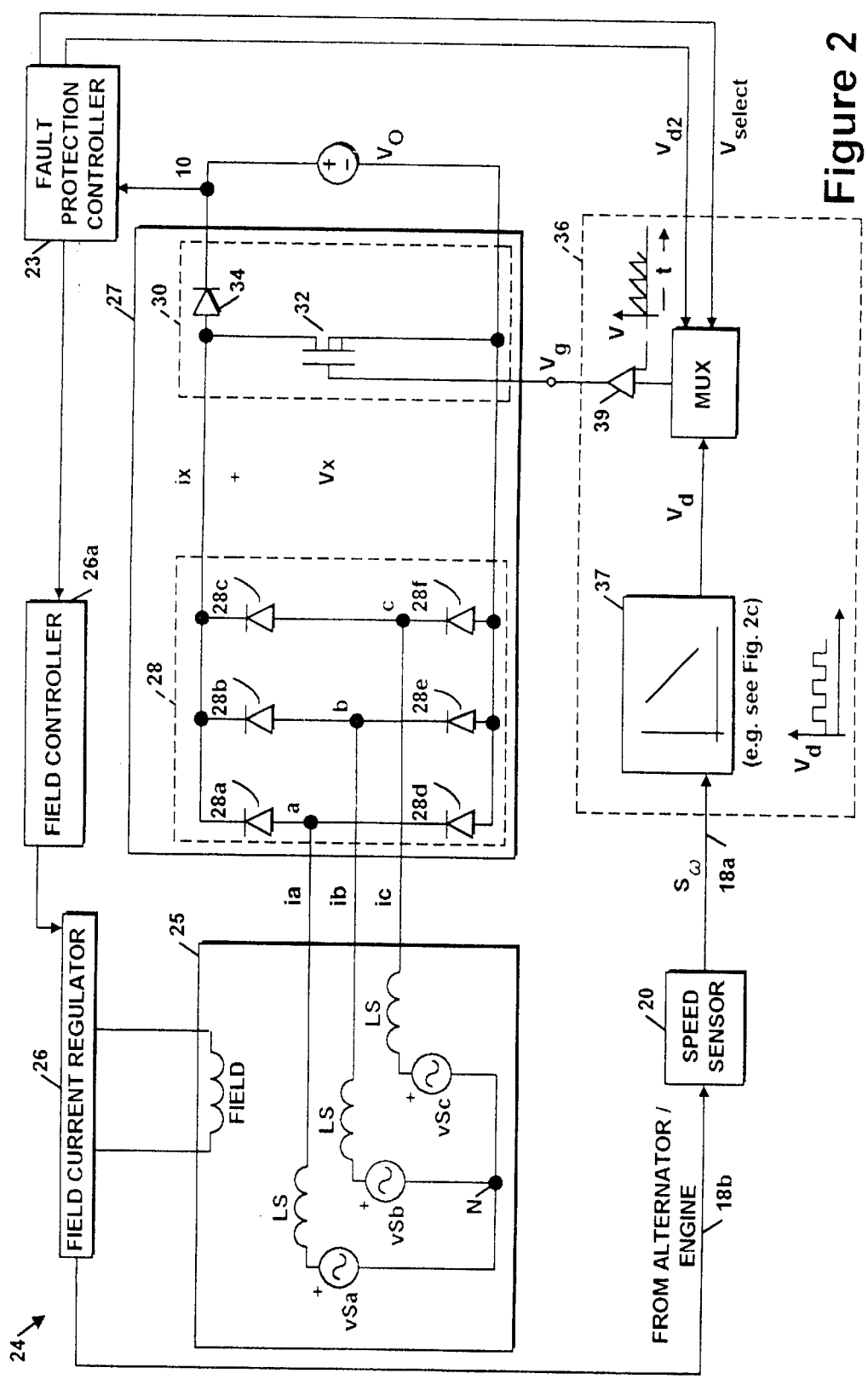
FIG. 2 is a schematic diagram of an alternator system.
Figure 2A:
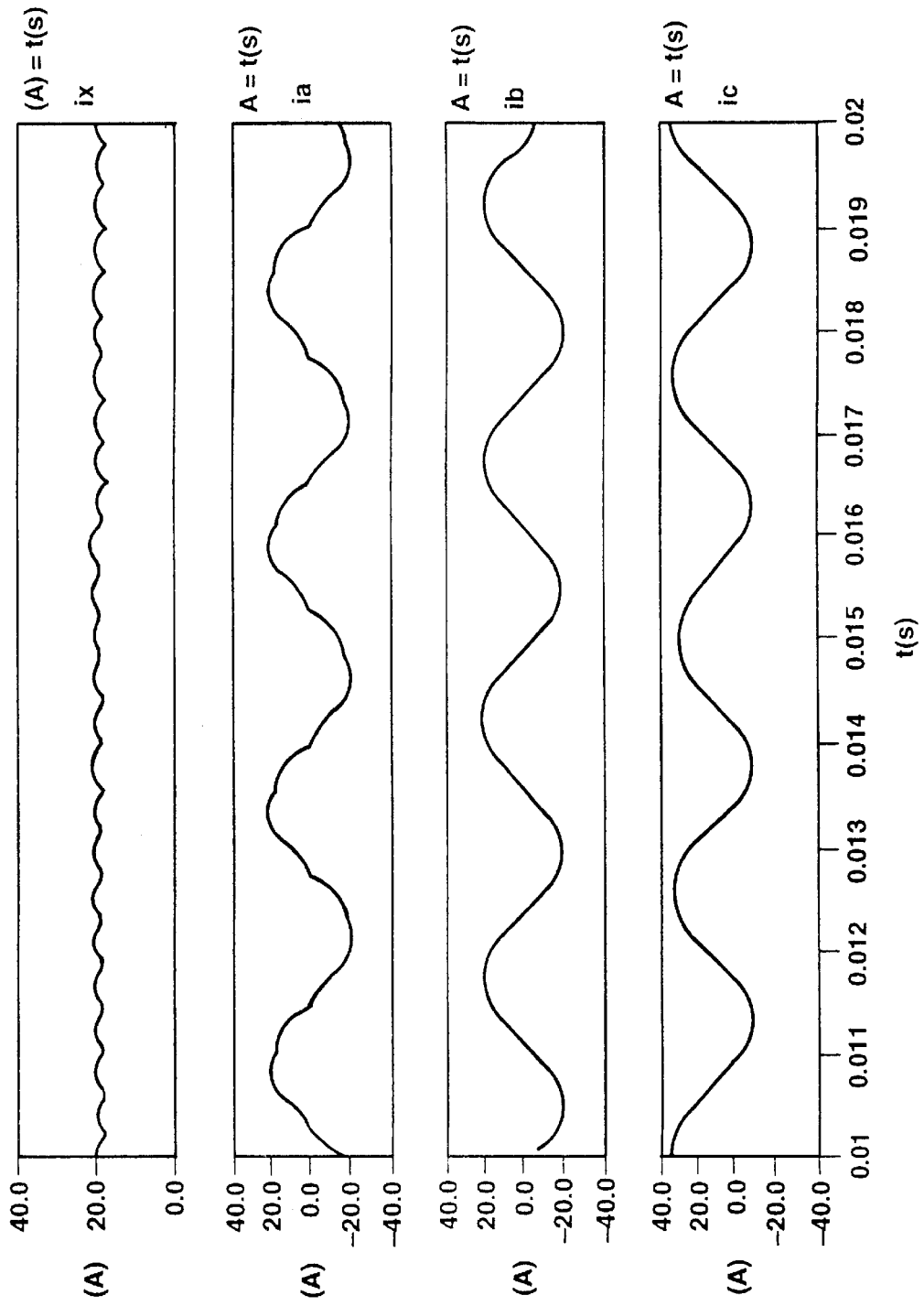
FIGS. 2A and 2B show several waveforms at various points in an alternator system of the type described in conjunction with FIG. 2.
Figure 2B:
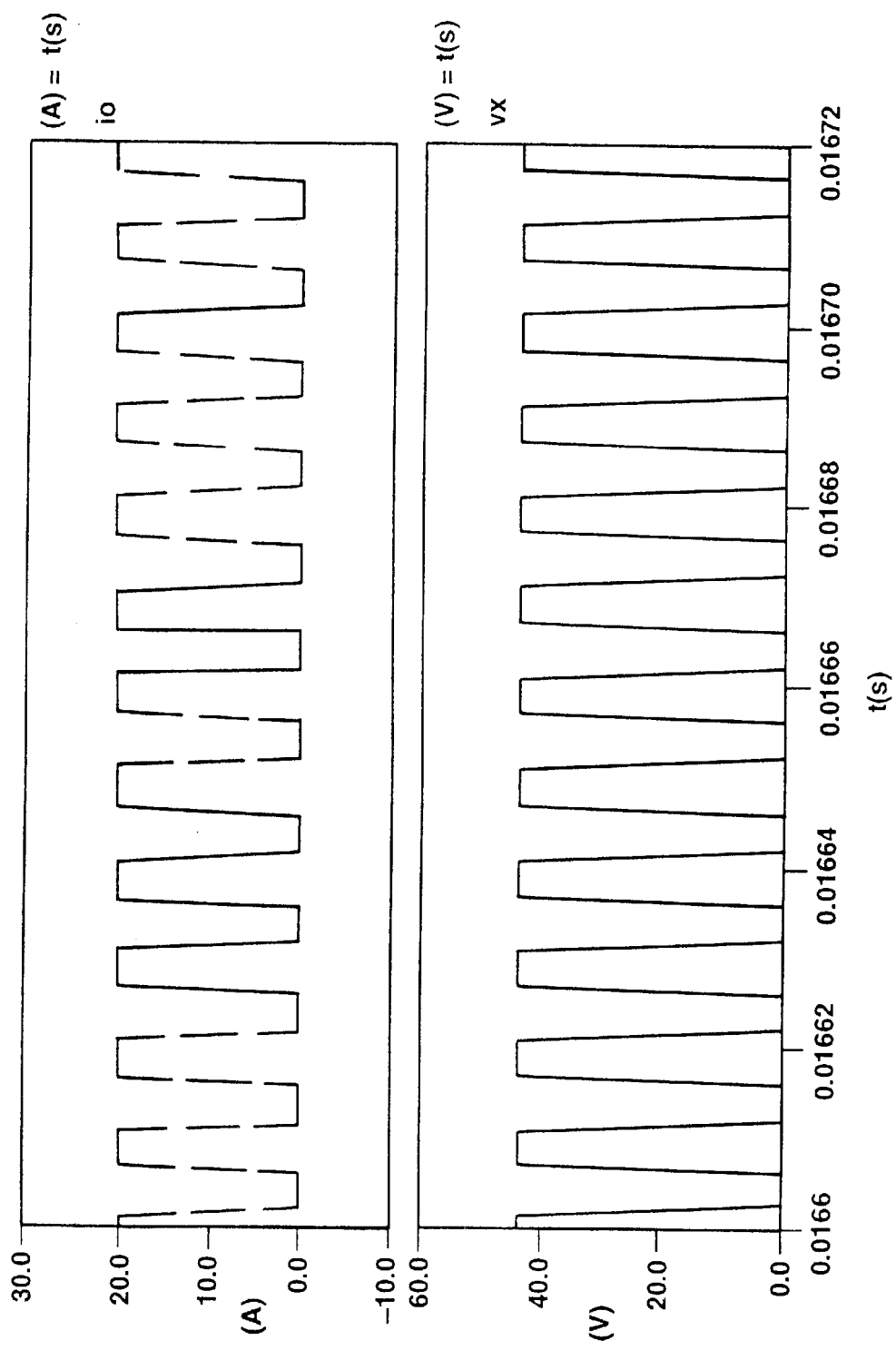

Waveforms of the signals in the switched-mode rectifier 27 and at the output of the alternator system are shown in FIGS. 2A and 2B.

A control circuit 36 is coupled to the boost converter 30. The control circuit generates a pulse-width modulation (PWM) gate command with duty ratio d. In this case, neither voltage nor current control are used. Instead the duty ratio of the PWM signal is determined as a function of alternator frequency or speed as provided by the speed sensor 20.

In particular, speed sensor 20 provides a signal $S_w$ representative of the frequency or speed of the alternator 25 to a conversion circuit 37. It should be appreciated that in alternate embodiments speed sensor 20 may derive the signal $S_w$ from the speed of the engine (not shown) an engine shaft (not shown) or any other portion of vehicle components which can be related to alternator speed. The conversion circuit 37 converts, transforms or otherwise adjusts the signal $S_w$ into a signal $V_d$ which is subsequently fed through a multiplexer (MUX) 38 to a first terminal of a comparator 39. The second terminal of the comparator 39 is coupled to a reference signal (e.g. a ramp or saw-tooth waveform signal). The conversion circuit 37 provides the signal $V_d$ to the first terminal of the comparator 39 through a MUX. The comparator 39 compares the signal level of the signal $V_d$ to the signal level of the reference signal and provides a signal voltage $V_g$ having a high or low value at the comparator output. Thus, the gate voltage $V_g$ is provided to the switched mode rectifier 30 from the comparator 39 and has a duty ratio determined by the value of the signal $V_d$ and the reference signal.

When the value of the gate voltage Vg is above a first threshold value the switch 32 is biased into a first conductive state (e.g. the switch 32 is turned on) and when the value of the gate voltage Vg is below the threshold value the switch 32 is biased into a second conductive state (e.g. the switch 32 is turned off). In this manner, the gate voltage $V_g$ thus sets the duty ratio of the switched-mode rectifier 30 at a particular value.

For example, assume that the reference signal has saw tooth waveform and a voltage level between zero and one volt and also assume that the speed sensor provides the signal $S_w$ having value between zero and one (where a value of zero indicates that the alternator has a frequency or rpms of zero and a value of one indicates that the alternator speed is at a maximum value. Thus, if the speed sensor 20 provides a signal Sw having a signal level corresponding to an alternator speed of about 2400 rpms, then from FIG. 2C it can be seen that a duty ratio of about 0.5 is required and the circuit 37 would provide $V_d$ having a signal level of about 0.5 volts.

One exception to duty ratio computation which occurs is during a load dump fault transient in which case fault protection controller 23 determines duty ratio as described above.

It should be noted that the SMR control circuit does not receive a direct feedback signal from the alternator system output. However, during a load dump fault transient, the duty ratio is determined by the fault protection control circuit which does measure the output voltage Vo.

In operation of the alternator system 24, field control is used as a primary means of regulating the output voltage or current of the alternator system 24. At the same time, the switch 32 is turned on and off at relatively high frequency in a Pulse-Width Modulation (PWM) fashion with duty ratio d. The duty ratio d corresponds to the on time duty cycle of the FET 32 (defined as the ratio of the on time of the FET 32 divided by the sum of the on time and the off time of the FET 32). In an averaged sense, the boost switch set acts as a dc transformer, with a transformation ratio controlled by the duty cycle.

As with a conventional diode-rectified alternator system, the diode bridge operates in continuous conduction mode (CCM), so that the diode 34 is on when the switch 32 is off. The PWM operation of the switch 32 and the diode 34 causes the voltage $v_x$ to be a pulsing waveform (see FIG. 2B) with an average value dependent on the output voltage $v_o$ and the duty ratio d. Neglecting device drops, and assuming $v_o$, is relatively constant over a PWM cycle, the local average value of $v_x$ denoted as $<v_x>$ may be computed as:

$$<v_x> = (1-d) \cdot v_o$$

Because the PWM frequency is much higher than the ac frequency, and because the inductances $L_s$ of the alternator 25 are relatively large, the alternator and diode bridge react to the average value of $v_x$ in a manner very similar to the manner as they would react to the output voltage in a conventional diode-rectified alternator system. As a result, by controlling the duty ratio d, one has control over the average voltage at the output of the bridge, $V_x$, to any value below the true output voltage of the alternator system, $v_o$. Thus, in the system of the present invention, the switched-mode rectifier 27 is used as an additional control handle to extract much higher levels of performance from the alternator.

For example, consider that in the system of the present invention, the maximum possible output power of the alternator at a given speed and field current is determined by the average value of the voltage $v_x$, and not by the output voltage $v_o$. By adjusting the duty ratio d, the alternator can generate up to its maximum power (across voltage) as alternator speed varies, while supplying a constant output voltage, $v_o$. For example, a constant output voltage of 14 V or of 42 V may be provided.

Figure 2C:
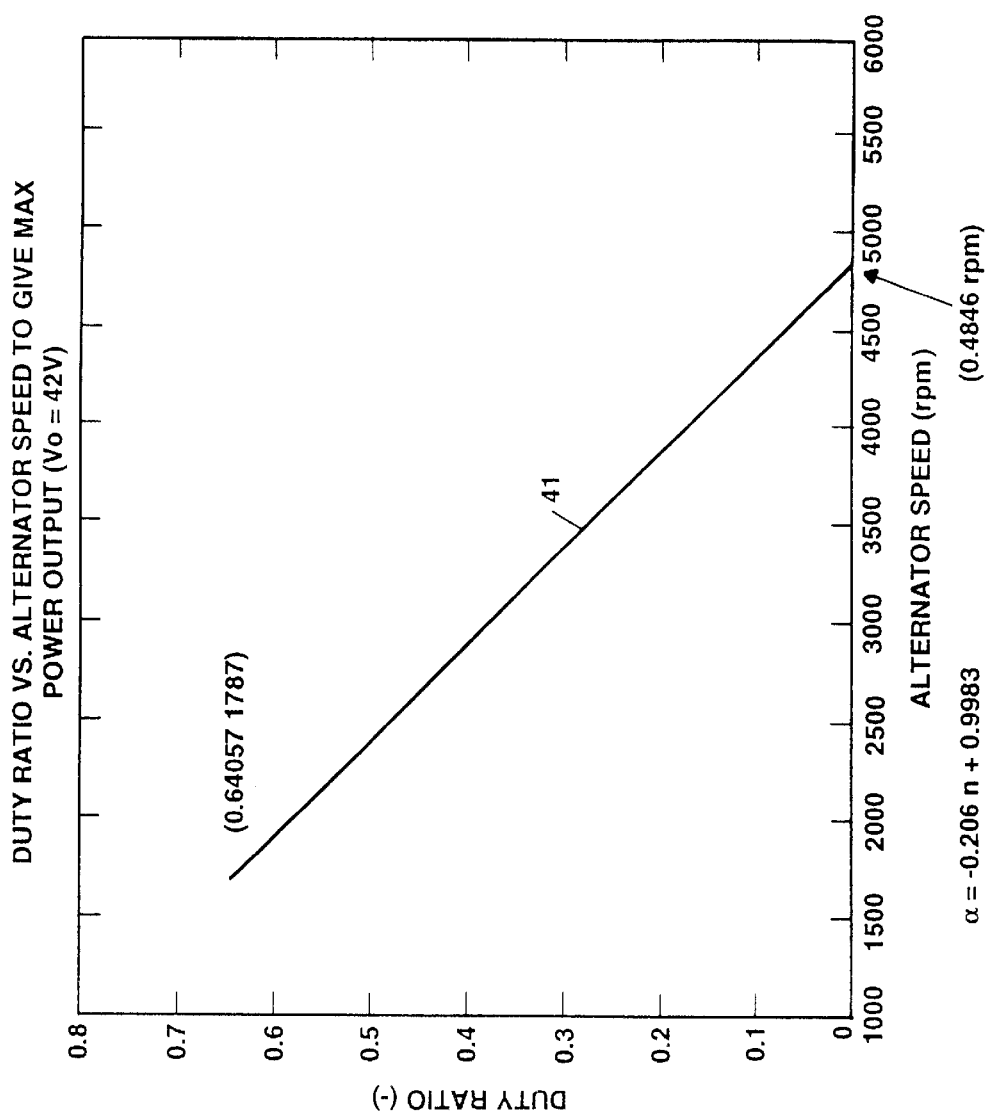
FIG. 2C is a plot of duty ratio vs. alternator speed.

Referring to FIG. 2C, a curve 41 showing the duty ratio needed to provide a predetermined output power for a particular commercial alternator with an alternator system output voltage of 42 V is shown. For example, with an alternator system output voltage of 42 V, to obtain a predetermined power output at or close to the maximum power output with an alternator speed of 1787 rpm, the switched mode rectifier should be provided having a duty ratio of about 0.6405

The circuit of the present invention can also be operated to provide active "load-dump" protection.

In a conventional high-reactance alternator system, a serious over-voltage condition can occur when the output current is suddenly reduced by a large amount. This important condition, known as "load dump", occurs because the voltage drops across the machine reactances decrease with the decreased load current, resulting in a much larger fraction of the back emf of the machine being impressed across the output. The voltage will be higher than desired until the field controller can reduce the field current to the new appropriate level (a relatively slow process). In conventional 14-volt automotive alternators, load dump transients as high as 80 V and lasting hundreds of milliseconds can sometimes occur, resulting in serious transient suppression and circuit protection problems.

In the present invention, however, active load dump protection can be provided by coordinated control of the field winding and the switched-mode rectifier via the fault protection controller 23, for example. Once a load-dump condition is detected, the output voltage transient can be suppressed by control of the rectifier 27 while field controller 26a is used to reduce the back emf of the machine 25 via the field current regulator 26. In the simplest version of the approach, the boost switch(es) of the rectifier can be turned on continuously and the field current regulator 26 can be adjusted for deexcitation of the field until the field current and machine currents are at an acceptable level. A more sophisticated version of the approach would adjust the pulse-width modulation of the switched-mode rectifier 27 in concert with the field current regulator 26 to suppress the transient.

The system of the present invention operates with the diode bridge in CCM, while the boost switch operates under PWM at a relatively high frequency. The operating characteristics can be derived based on those of an uncontrolled bridge as described in V. Caliskan, D. J. Perreault, T. M. Jahns, and J. G. Kassakian, "Analysis of Three-Phase Rectifiers with Constant-Voltage Loads," 1999 *IEEE Power Electronics Specialists Conference,* 1999, pp. 715–720 which is hereby incorporated herein by reference in its entirety. The magnitude of the source (back emf) voltages are controlled by the field current, $i_f$, and may be approximated as:

$$V_s = k \cdot \omega \cdot i_f$$

Using well known modeling techniques such as those described in the above-cited "Analysis of Three-Phase Rectifiers with Constant-Voltage Loads," and neglecting device drops, circuit resistance terms, and other nonidealities, it can be shown that as long as heavy CCM is maintained in the line currents, and the condition $$V_s > \frac{2}{\pi}(1-d)v_o$$

is met, the average rectified output current will be approximately:

$$<i_o> = 3(1-d)(\text{sqrt}[V_s^2 - (4/\pi^2)(1-d)^2 v_o^2])/\pi \omega L_s$$

In this equation, one can see that the average output current of the rectifier is a function of both the field current $i_f$ (which determines $V_s$) and the duty ratio d. In this case, the ac inductor current waveforms $i_a$, $i_b$, and $i_c$ will be continuous and approximately sinusoidal with fundamental current magnitudes:

$$I_s = \frac{\sqrt{V_s^2 - \frac{4}{\pi^2}(1-d)^2 v_o^2}}{\omega L_s}$$

and phases with respect to the ac voltages of:

$$\phi = \operatorname{atan}\sqrt{\left[\frac{\pi V_s}{2(1-d)v_o}\right]^2 - 1}\,.$$

In the alternator system of the present invention, there are multiple handles on the control of the alternator system. As a result, one can achieve higher levels of output power, efficiency, and transient control than can be achieved via conventional means while retaining a relatively simple circuit structure and control.

While the embodiment of the invention illustrated in FIG. 2 is relatively simple and effective, those of ordinary skill in the art will now appreciate that variants, such as that described below in conjunction with FIGS. 4, 6–10, 12, 12A, and 13, based on the same principles exist which have advantages in some applications.

Figure 3:
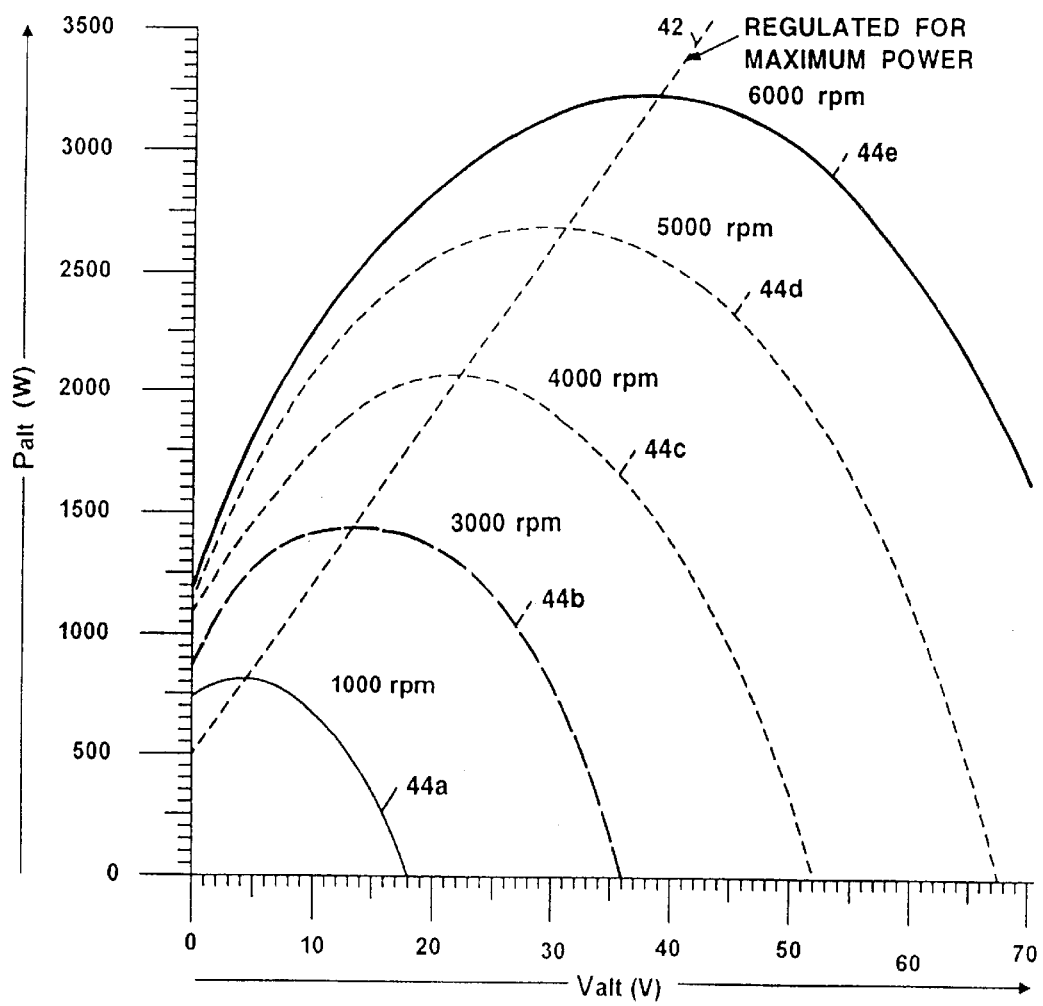
FIG. 3 is a plot of alternator output power versus alternator output voltage at full field.

Referring now to FIG. 3 a plot of the calculated output power vs. output voltage of a conventional 14 V diode-rectified alternator at constant (full) field current, parameterized by the alternator rpm is shown. Using the switched-mode rectifier approach described above, the effective bridge voltage seen by the alternator can be varied so that more power can be extracted from the alternator across a range of alternator speeds. The circuit of the present invention allows operation along the operating locus illustrated as line 42 for extracting a predetermined power over a range of alternator operating speeds as shown in FIG. 3. It should be noted that the actual output voltage may be any value equal to or greater than the effective alternator voltage at that point on the locus. Neglecting device drops, circuit resistance terms, and other nonidealities, it can be shown that the locus of line 42 can be followed for maximum field current $i_{f,max}$ by selecting a SMR duty ratio equal to:

$$d = 1 - \left(\frac{\sqrt{2}\,\pi k}{4V_o}\right) \cdot i_{f,\max} \cdot \omega$$

where d is constrained in the range $0 \leq d \leq 1$. Other functional or empirical relationships for d may also be utilized to follow the locus of line 42 in consideration of circuit nonidealities.

As discussed above, k corresponds to a value which represents a relationship between machine speed and back emf voltage and ω corresponds to machine speed. The units of k and ω are selected to be compatible (for example if $i_{f,max}$ is in amperes and ω is in rpms then the units of k are selected to be V/rpm/amperes.

Figure 3A:
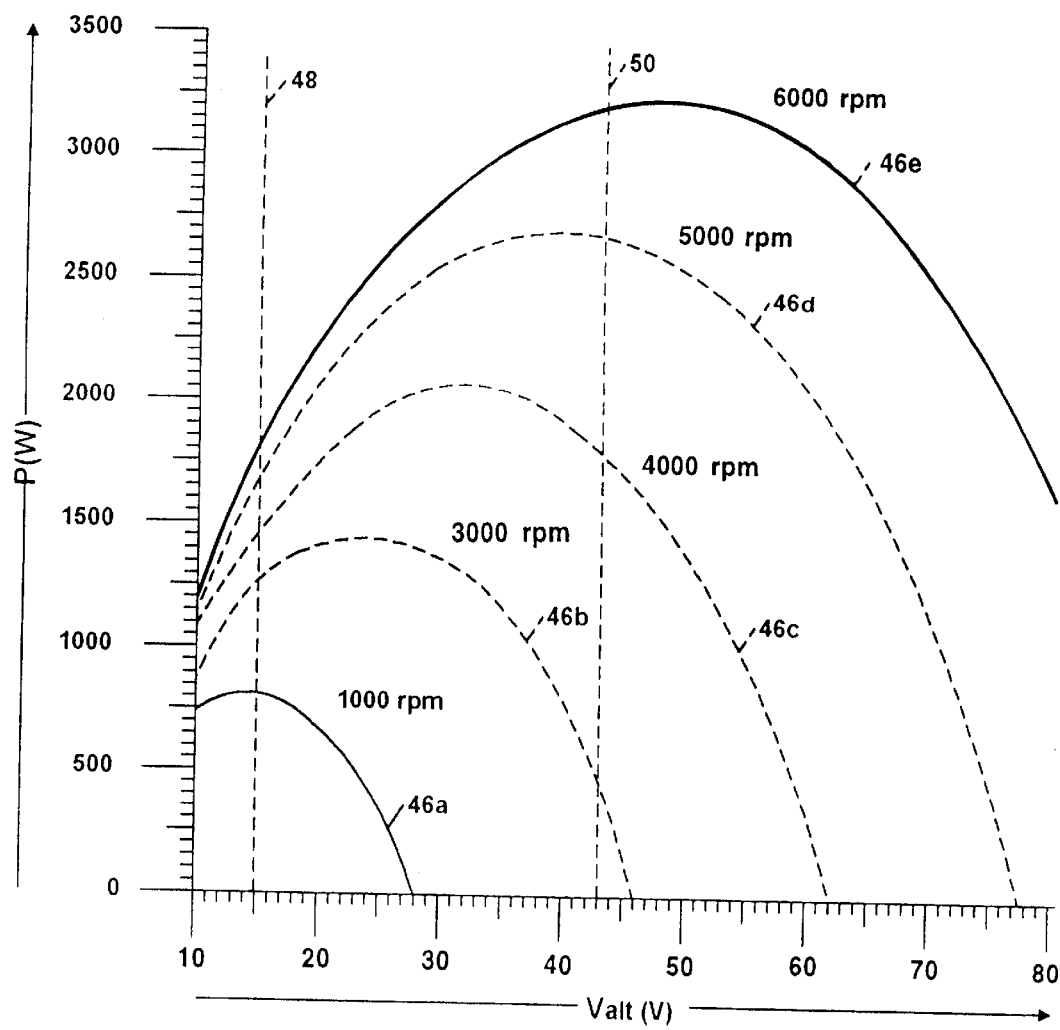
FIG. 3A is a plot of alternator output power versus alternator output voltage.

FIG. 3A shows a plot of the calculated output power vs. output voltage of a conventional 14 V diode-rectified alternator at constant (full) field current, parameterized by the alternator rpm. The operating loci for supplying constant-voltage 14 V and 42 V loads (denoted as lines 48 and 50 respectively) via conventional diode rectifier are also shown.

Comparing FIGS. 3 and 3A, it is apparent that the mode of operation of the present invention allows much more power to be drawn from the machine at most speeds than is achievable with a diode rectifier supplying an output voltage of 42 V as shown in FIG. 3A. What makes this possible is that the switched-mode rectifier provides the necessary controlled voltage transformation.

In addition to trends for conventional automotive alternators to provide higher power levels, there will be a need for high-power automotive alternator systems which generate power at higher voltages (e.g. at a voltage of 42 V instead of 14 V). With the present invention, even present 14 V machine designs are suitable for high-power operation at 42 V output since only the rectifier stage and controls need to be changed, as can be inferred from FIG. 3. Manufacturing both 14 V and 42 V versions of an alternator on the same manufacturing line would be possible and would result in savings of time and expense. Thus, the present invention is timely for meeting the demands of higher power and higher voltage alternators in the automotive industry while remaining within the existing manufacturing framework and overcoming the present day load dump transient problem.

Because of its voltage transforming effect, the switched-mode rectifier allows much higher levels of current and power to be extracted from the alternator than would be possible with a conventional diode rectifier. At the same time, the output current or voltage can be efficiently regulated to any value below the maximum via field control.

This contrasts with the approach taken in prior art systems such as those described in U.S. Pat. No. 5,793,625 and the article entitled "Variable Speed Operation of Permanent Magnet Alternator Wind Turbines Using a Single Switch Power Converter," in which control of the switching rectifier alone is used to regulate output current or voltage. Unlike the low-reactance case considered in such prior art systems, regulating the output using the switching rectifier in high-reactance machines such as the Lundell alternator can have serious disadvantages. For example, considering the alternator operating characteristics of FIG. 3A for an alternator supplying an output voltage of 42 V at a speed of 6000 rpm, maximum output power at 42 V output would be achieved by using a duty ratio d=0. Reducing the output power by control of the switched-mode rectifier can only be achieved by increasing the duty ratio. In addition to reducing the output current, this would have the effect of reducing the effective alternator voltage $v_x$, and in turn increasing the machine and semiconductor device currents. (In the limiting case, zero output current and power is achieved at a duty ratio d=1, with the machine operating at high current into a short circuit provided by the switching rectifier.) As a result, for the machine characteristics of FIG. 3A, regulating the output using only a switching rectifier can result in very poor part-load efficiency. In the present invention, however, the output power can be efficiently regulated below the maximum using field control. The problem presented by prior art systems does not exist.

Figure 4:
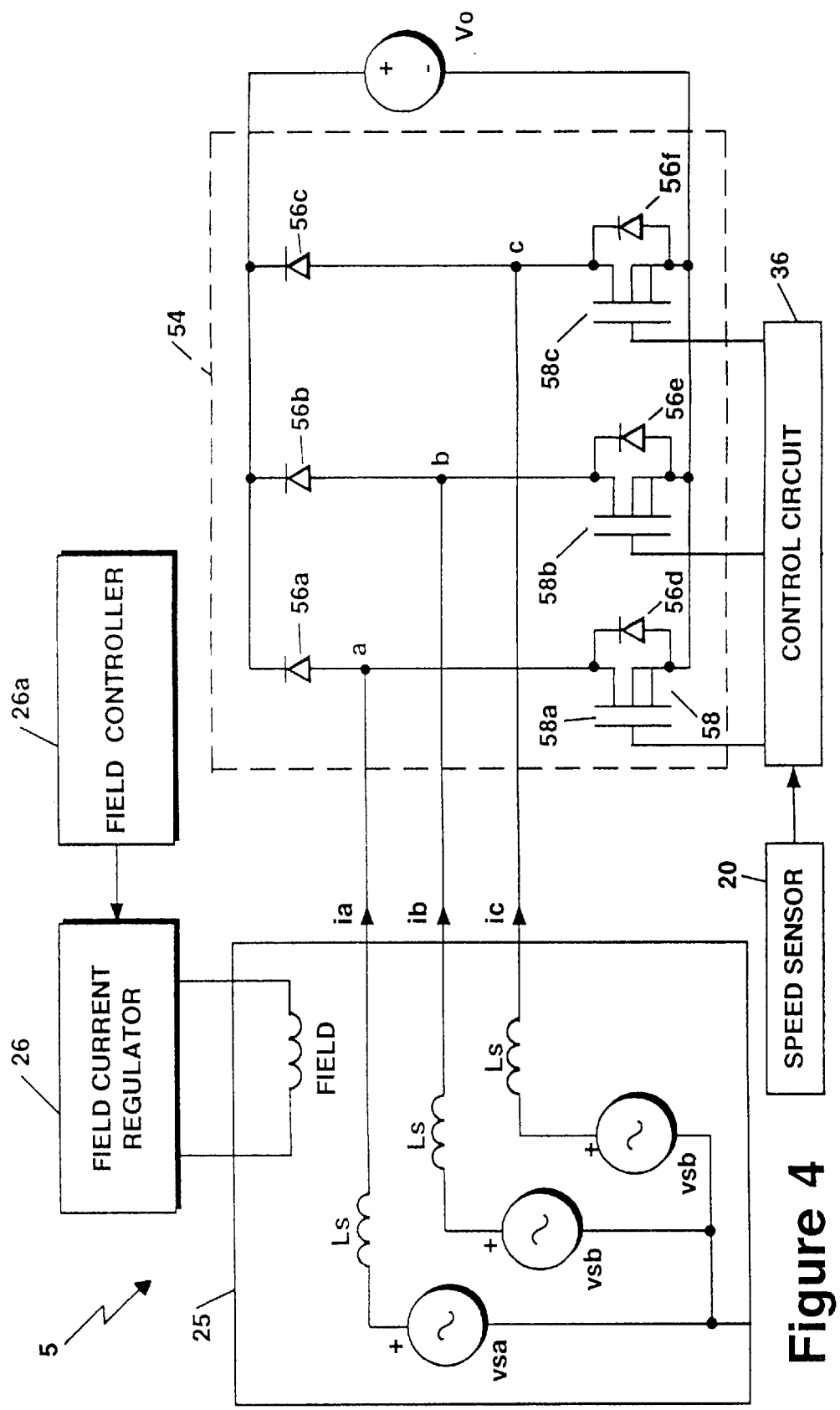
FIG. 4 is a schematic diagram of an alternator system.

Referring now to FIG. 4, an alternator system 52 includes the alternator 25 and a field current regulator and field controller 26, 26a which operate in the same manner as the alternator, field current regulator and field controller described above in conjunction with FIG. 2. The alternator 25 is coupled to a switched-mode rectifier circuit 54. Although not here shown, the alternator system 52 can optionally include a fault protection circuit and a state regulator as described above in conjunction with FIGS. 1, 1B, 1C, and 1D, respectively.

In this particular embodiment, rectifier circuit 54 includes a bridge circuit comprising a plurality of diodes 56a–56f and having a PWM stage 58 integrated therein. The PWM stage 58 includes a plurality of switches 58a, 58b, 58c which are gated on and off together in a PWM fashion with duty ratio d via control signals provided by control circuit 36. Operation in this mode yields waveforms $i_a$, $i_b$, $i_c$, and $i_o$ that are essentially the same as those of the circuit of FIG. 2, along with the same duty-ratio control characteristics.

One advantage of this embodiment is that there are fewer series device drops than in the circuit of FIG. 2, thus resulting in lower losses. Furthermore, if MOSFETs are used for the active switches 58a–58c, external antiparallel diodes 56d–56f can be eliminated, and synchronous rectification can be implemented for those devices as well (using a additional conventional control circuitry well known to those of ordinary skill in the art), thereby further reducing losses.

It should be noted that the manner in which the PWM stage 58 is operated is different than in prior art systems. In prior art systems, the duty ratio of the PWM stage is determined as a function of output voltage in order to regulate the output voltage. In the present invention, however, the duty ratio of the PWM stage is determined as a function of alternator speed, in order to allow "load matching" (e.g. following the locus 42 in FIG. 3 so that maximum power can be extracted from the alternator 25).

Figure 1B:
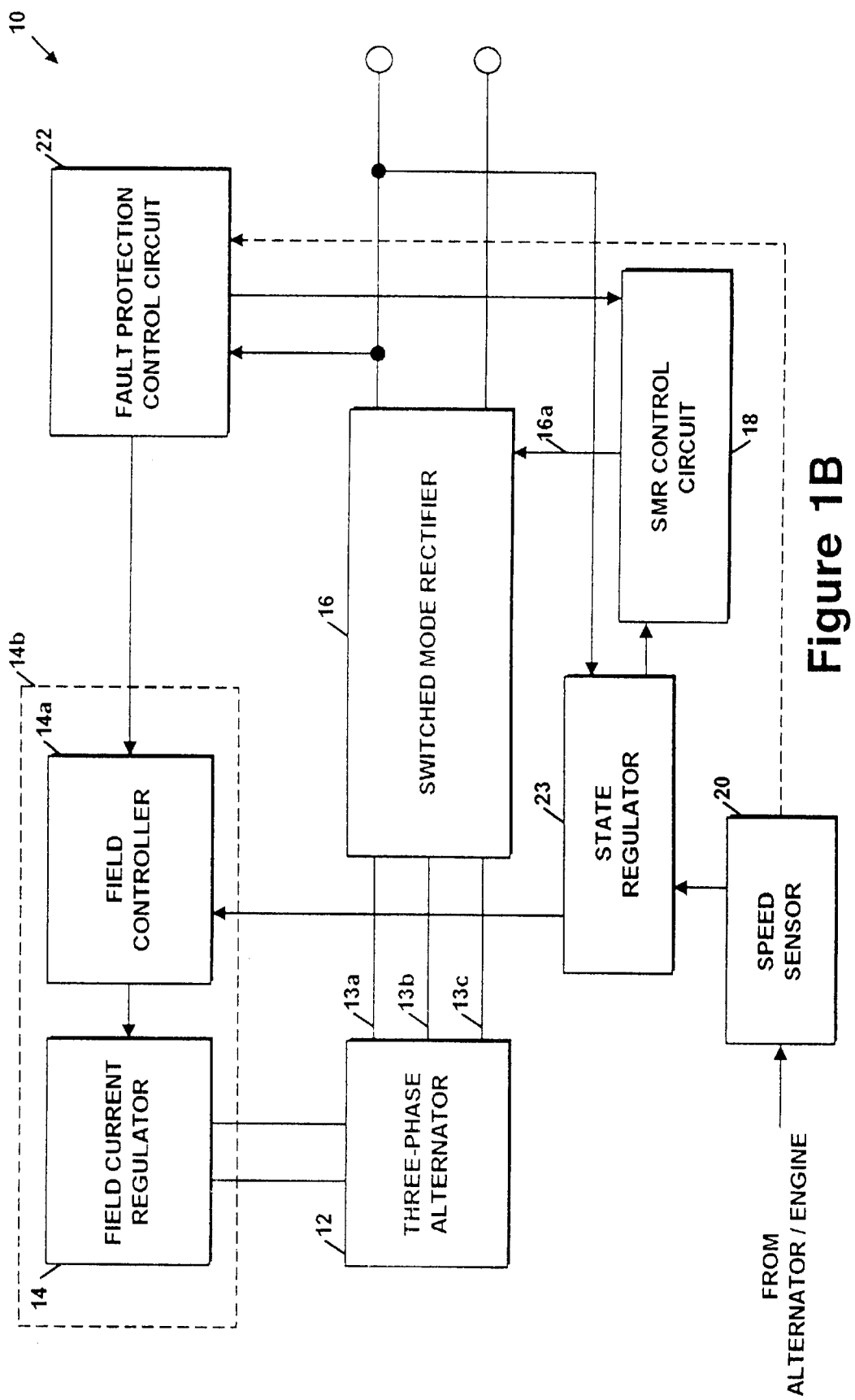
FIG. 1B is a block diagram of an alternator system.
Figure 1C:
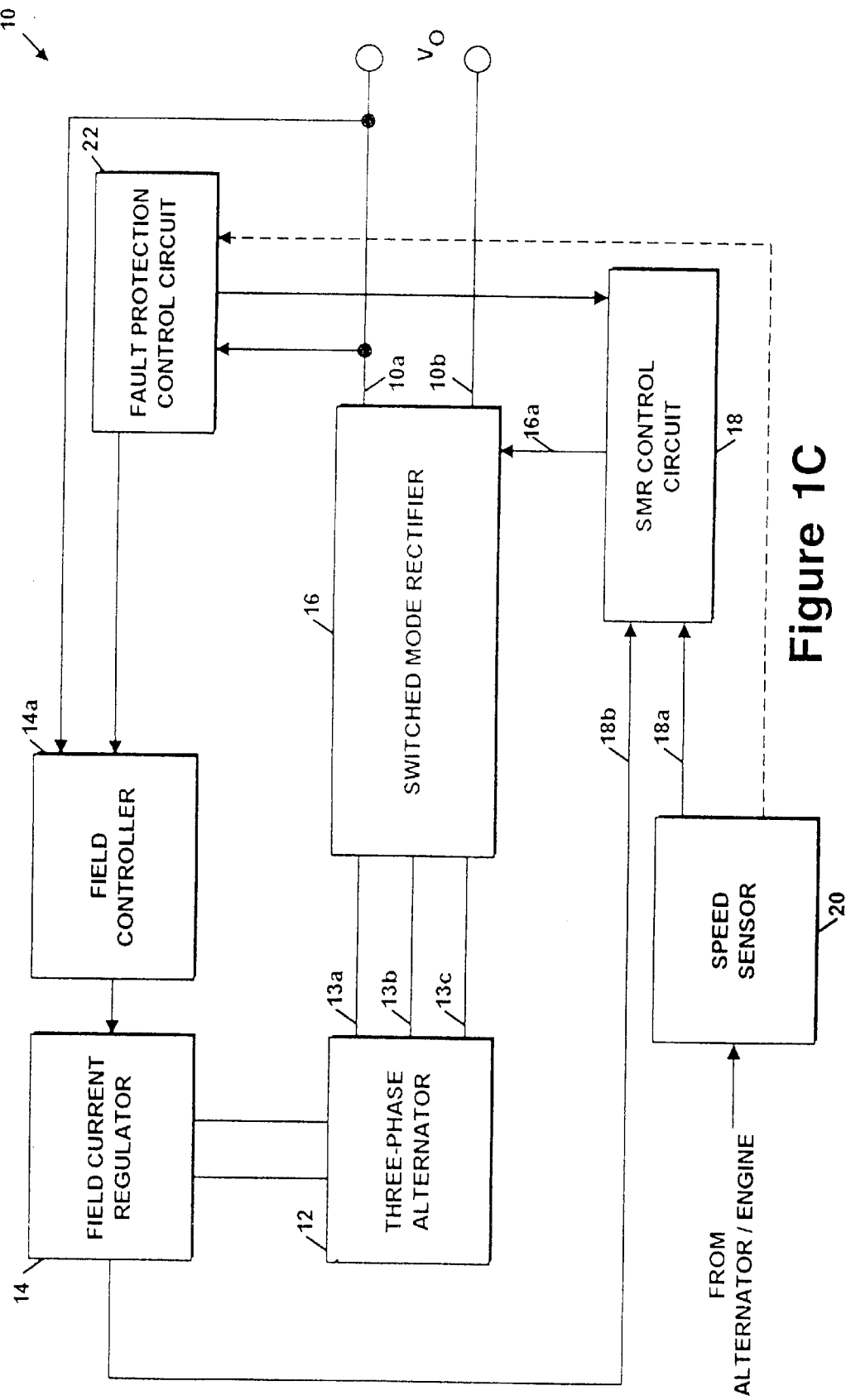
FIG. 1C is a block diagram of an alternator system.

Referring now to FIG. 1C, an alternator system 10 having output terminals 10a, 10b includes a three phase alternator 12 having a field current regulator 14 and a switched-mode rectifier 16 coupled thereto. The field current regulator 14 receives control signals from a field controller 14a and functions to regulate the output voltage at terminals 10a, 10b of the alternator system 10. The alternator 12 provides power along three signal paths 13a, 13b, 13c to the switched-mode rectifier circuit 16. The switched-mode rectifier receives the power from the alternator 12 and also receives a duty cycle control signal along path 16a from a switched-mode rectifier (SMR) control circuit 18. The SMR control circuit 18 receives sensing signals at an input terminal 18a from a speed sensor 20 which may be provided as a tachometer for example. The speed sensor 20 senses the engine speed or alternator speed and provides a frequency or speed signal to the SMR control circuit 18 along a signal path 18a. It should be appreciated that the speed sensor can sense any parameter or combination of parameters related to ac machine speed (e.g. engine speed, frequency, alternator speed, frequency, alternator back EMF or back EMF frequency, or any quantity from which the appropriate information can be observed or estimated) and provide an appropriate signal to the SMR control circuit. The SMR control circuit 18 receives sensing signals at an input terminal 18b from the field current regulator 14 (or alternatively from the field controller 14a). The sensing signal at input terminal 18b contains information about the field current of the machine, and may be provided as a voltage proportional to actual field current. It should be appreciated that the sensing signals provided by the field regulator 14 to the SMR control circuit 18 at input terminal 18b may be any signal related to field current (e.g. field current, average field voltage, field regulator duty ratio, commanded field current, commanded field voltage, magnetic field strength due to the field winding, etc.) or any quantity from which the appropriate information about the field current can be observed or estimated.

Based upon the frequency or speed of the alternator 12 and the field current of the alternator 12, the control circuit 18 provides duty signals along signal path 16a to control the operation (e.g. a duty ratio) of the switched-mode rectifier 16. The switched-mode rectifier 16 functions to provide "load matching" between the alternator 12 and a load so that the power level which can be extracted from the alternator 12 is higher than that which could be achieved with a diode rectifier, for example. The speed of the alternator 12 provided from speed sensor 20 and the field current of the alternator 12 provided from the field current regulator 14 correspond to the input signals provided to the SMR control circuit 18 which causes the switched-mode rectifier 16 to operate at a particular duty ratio.

Figure 2D:
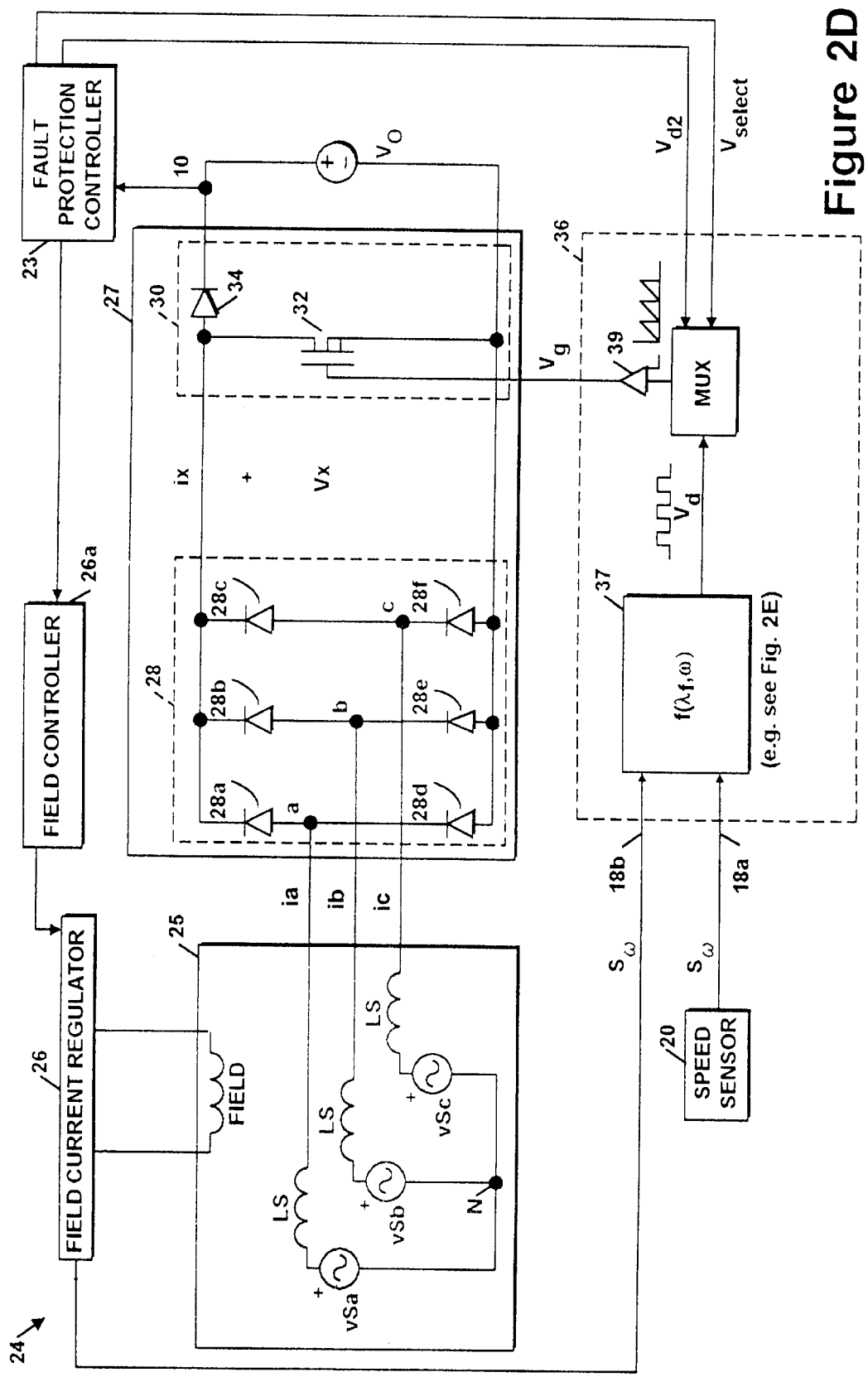
FIG. 2D is a schematic diagram of an alternator system which utilizes both field control and a speed sensor.

Referring now to FIG. 2D, an alternator system 24 which may be similar to alternator system 10 described above in conjunction with FIG. 1C includes a wound-field alternator 25 with field control provided by a field current regulator 26 coupled to a field controller 26a. A switched-mode rectifier 27 coupled to the alternator 25 includes a diode bridge coupled to the alternator 25 as shown. Coupled to the diode bridge is a boost switch set or boost stage 30 comprising a controlled switch 32 and a diode 34. A control circuit 36 is coupled to the boost stage 30. The control circuit generates a pulse-width modulation (PWM) gate command with duty ratio d. In this case, the duty ratio of the PWM signal is determined as a joint function alternator frequency or speed (as provided by speed sensor 20) and alternator field current (as provided by field current regulator 26).

Figure 2E:
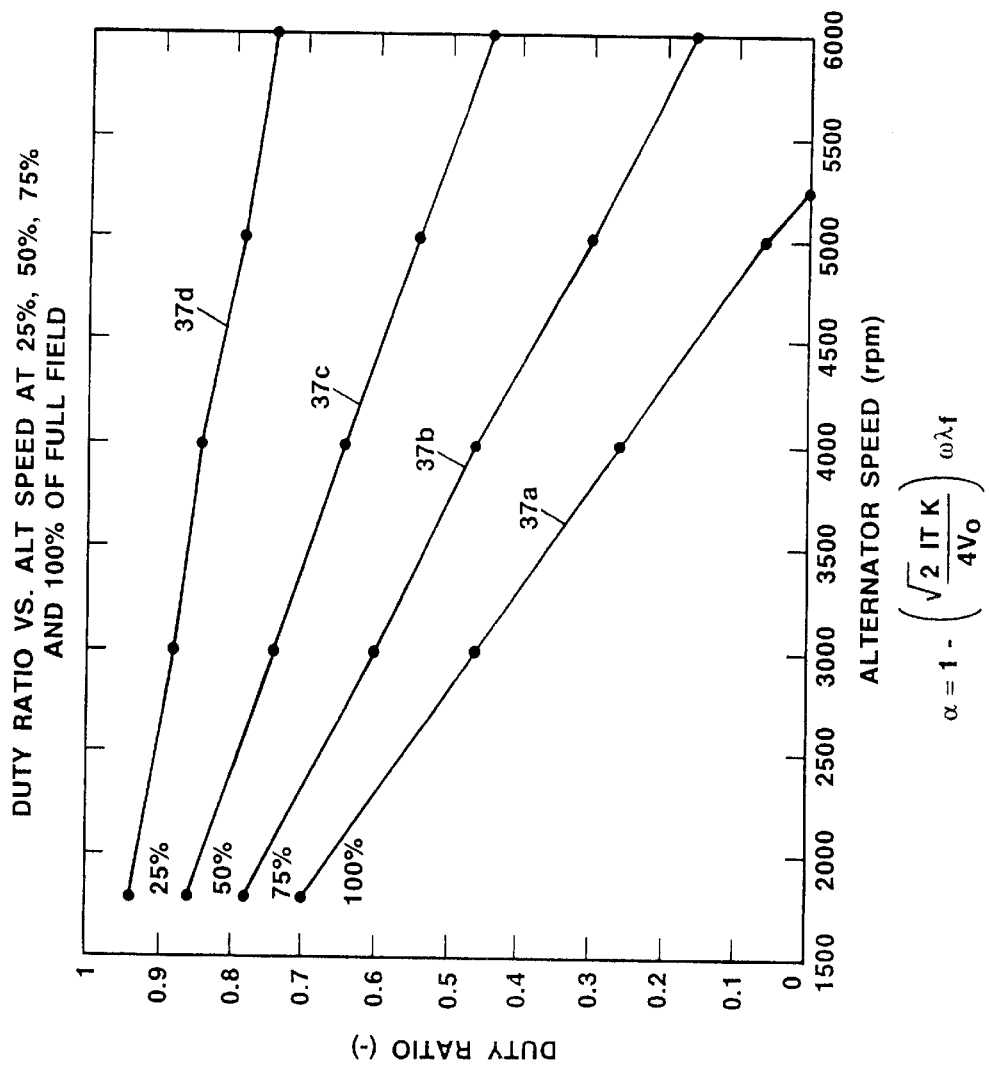
FIG. 2E is a plot of duty ratio vs. alternator speed.

In particular, speed sensor 20 provides a signal $S_w$ proportional to the speed or frequency of the alternator to a conversion circuit 37. Field current regulator 26 provides a signal $S_{if}$ proportional to the field current to the conversion circuit 37. The conversion circuit 37 combines and transforms these signals into a signal $V_d$ which is subsequently fed through a multiplexer (MUX) 38 to a first terminal of a comparator 39. The second terminal of the comparator 39 is coupled to a reference signal (e.g. a ramp or saw-tooth waveform signal). The conversion circuit 37 provides the signal $V_d$ such that the gate voltage $V_g$ is provided to the switched-mode rectifier 30 from the comparator 39. The gate voltage $V_g$ sets the duty ratio of the switched-mode rectifier at a particular value. Essentially the alternator speed is fed to the circuit 37 and the field current is provided from field current regulator 26. Thus, in accordance with the relation between the field control and the speed (as shown in FIG. 2E for example, circuit 37 provides a signal $V_d$ having a voltage level which results in the switched mode rectifier having the desired duty ratio.

In this embodiment of the invention, the duty ratio d is selected to provide "load matching" at every level of alternator speed and field current. This allows the alternator to achieve much higher levels of output power than is conventionally achieved, and also provides for very efficient operation over a wide range of partial load conditions. Neglecting device drops, circuit resistance terms, and other nonidealities, it can be shown that the load matching locus can be followed for any field current $i_f$ by selecting a SMR duty ratio equal to:

$$d = 1 - \left(\frac{\sqrt{2}\,\pi k}{4V_o}\right) \cdot i_f \cdot \omega$$

where d is constrained in the range $0 \leq d \leq 1$. The value of $V_d$ can thus optionally be provided by circuit 37 by the circuit implementing a function equal or equivalent to one minus a scaled version of the product of the field current and speed signals. (It should be recognized that similar approaches such as controlling the complement of the duty ratio d'=1–d also result in very simple control circuit implementations.) Other functional or empirical relationships for d or d' based on alternator speed and field current can also be utilized to follow the load matching locus in consideration of circuit nonidealities, or to achieve other design objectives. It should be recognized that the boost rectifier structure of FIG. 4 can be equally well employed in this embodiment.

In comparison to the embodiment of FIG. 2, for example, this embodiment allows the same high maximum output power to be achieved. This embodiment also allows load matching to be achieved at part-load operation, when less than maximum field current is required. In this part of the operating range, lower levels of field current and higher levels of efficiency can be achieved with this embodiment at the expense of a slight increase in controller complexity (e.g. a feedback signal path from rectifier 26 to circuit 37).

Referring now to FIG. 2E, a series of curves 37a–37d showing the duty ratio needed to provide load match conditions at a variety of alternator speeds are shown. By selecting an alternator speed-duty ratio pair which fall on one of the curves 37a–37d, the selected duty ratio d provides "load matching" at the selected level of alternator speed and field current. An alternator operating along these curves achieves levels of output power which are relatively high compared with those conventionally achieved and also provides for very efficient operation over a wide range of partial load conditions.

For example, assuming an alternator operates at fifty percent of full field current and at an alternator speed of about four thousand rpm, by selecting the duty ratio to be output 0.64, the alternator operates at a "load match" condition at which the alternator provides power output at or close to the maximum possible power output for the given conditions.

Figure 1D:
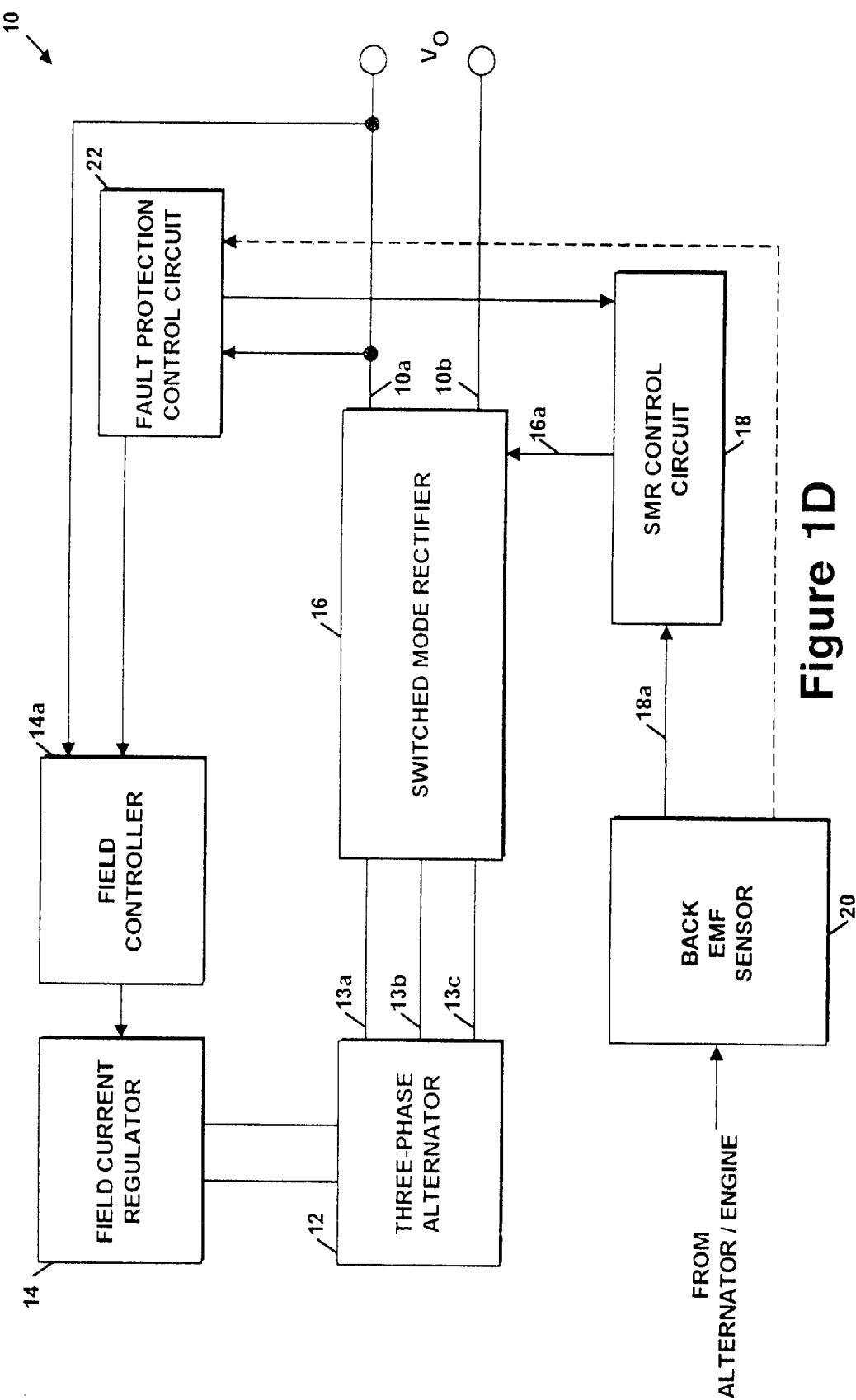
FIG. 1D is a block diagram of an alternator system.

Referring now to FIG. 1D, an alternator system 10 having output terminals 10a, 10b includes a three phase alternator 12 having a field current regulator 14 and a switched-mode rectifier 16 coupled thereto. The field current regulator 14 receives control signals from a field controller 14a and functions to regulate the output voltage at terminals 10a, 10b of the alternator system 10. The alternator 12 provides power along three signal paths 13a, 13b, 13c to the switched-mode rectifier circuit 16. The switched-mode rectifier receives the power from the alternator 12 and also receives a duty cycle control signal along path 16a from a switched-mode rectifier (SMR) control circuit 18. The SMR control circuit 18 receives sensing signals at an input terminal 18a from a back emf sensor 20.

The back emf sensor 20 senses the back emf of the machine, and provides a signal representative of a signal characteristic of the back emf (e.g. the magnitude or frequency of the back emf) to control circuit 18 along a signal path 18a. It should be appreciated that the back emf sensor can sense any parameter or combination of parameters related to ac machine back emf (e.g. back emf waveform, back emf waveform magnitude, field winding magnetic field strength, or any quantity from which the appropriate information can be observed or estimated) and provide an appropriate signal to the SMR control circuit. The back emf sensor may be implemented as an additional armature winding or set of windings and a peak detector circuit, for example.

Based upon the back emf or back emf magnitude of the alternator 12, the control circuit 21 provides duty signals along signal path 16a to control the operation (e.g. a duty ratio) of the switched-mode rectifier 16. The switched-mode rectifier 16 functions to provide "load matching" between the alternator 12 and a load so that the power level which can be extracted from the alternator 12 is higher than that which could be achieved with a diode rectifier, for example. The back emf or back emf magnitude of the alternator 12 provided from back emf sensor 20 corresponds to the input signal provided to the SMR control circuit 18 which causes the switched-mode rectifier 16 to operate at a particular duty ratio.

Figure 2F:
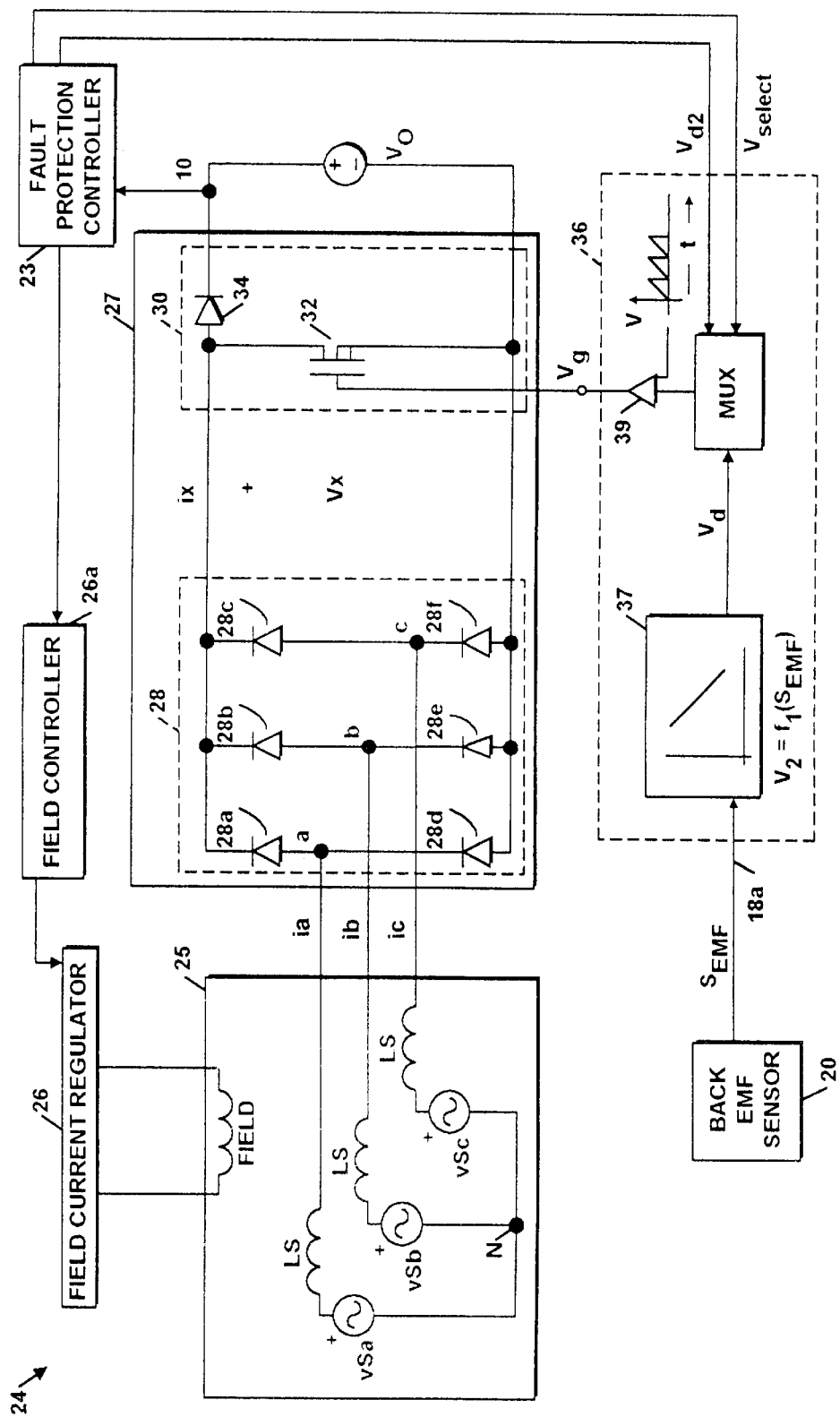
FIG. 2F is a schematic diagram of an alternator system which utilizes a back emf sensor.

Referring now to FIG. 2F, an alternator system 24 which may be similar to alternator system 10 described above in conjunction with FIG. 1D includes a wound-field alternator 25 with field control provided by a field current regulator 26 coupled to a field controller 26a. A switched-mode rectifier 27 coupled to the alternator 25 includes a diode bridge coupled to the alternator 25 as shown. Coupled to the diode bridge is a boost switch set or boost stage 30 comprising a controlled switch 32 and a diode 34. A control circuit 36 is coupled to the boost stage 30. The control circuit generates a pulse-width modulation (PWM) gate command with duty ratio d. In this case, the duty ratio of the PWM signal is determined as a function of alternator back emf or back emf magnitude (as provided by back emf sensor 20).

In particular, back emf sensor 20 provides a signal $S_{EMF}$ proportional to the back emf or back emf magnitude of the alternator to a conversion circuit 37. The conversion circuit 37 converts or transforms this signal into a signal $V_d$ which is subsequently fed through a multiplexer (MUX) 38 to a first terminal of a comparator 39. The second terminal of the comparator 39 is coupled to a reference signal (e.g. a ramp or saw-tooth waveform signal). The conversion circuit 37 provides the signal $V_d$ such that the gate voltage $V_g$ is provided to the switched-mode rectifier 30 from the comparator 39. The gate voltage $V_g$ sets the duty ratio of the switched-mode rectifier at a particular value.

In this embodiment of the invention, the duty ratio d is selected to provide "load matching" at every level of back emf. This allows the alternator to achieve much higher levels of output power than is conventionally achieved, and also provides for very efficient operation over a wide range of partial load conditions. Neglecting device drops, circuit resistance terms, and other nonidealities, it can be shown that the load matching locus can be followed for any machine back emf (source) voltage magnitude $V_s$, (or equivalently any speed and field current) by selecting a SMR duty ratio equal to:

$$d = 1 - \left(\frac{\sqrt{2}\pi}{4V_o}\right) \cdot V_s$$

where d is constrained in the range $0 \leq d \leq 1$. The value of the signal $V_d$ can thus optionally be implemented in the block 37 as one minus a scaled version of the back emf magnitude. (It should be recognized that similar approaches such as controlling the complement of the duty ratio d'=1−d also result in very simple control circuit implementations.) Other functional or empirical relationships for d or d' based on alternator back emf or back emf magnitude can also be utilized to follow the load matching locus in consideration of circuit nonidealities, or to achieve other design objectives. It should also be noted that the boost rectifier structure of FIG. 4 can be equally well employed in this embodiment.

In comparison to the embodiment of FIG. 2, for example, this embodiment allows the same high maximum output power to be achieved. This embodiment also allows load matching to be achieved at part-load operation, when less than maximum field current is required. In this part of the operating range, lower levels of field current and higher levels of efficiency can be achieved with this embodiment. In comparison to the embodiment of FIG. 2d, this embodiment allows similar levels of output power and part-load load matching to be achieved but requires different sensing and control circuitry.

Figure 2G:
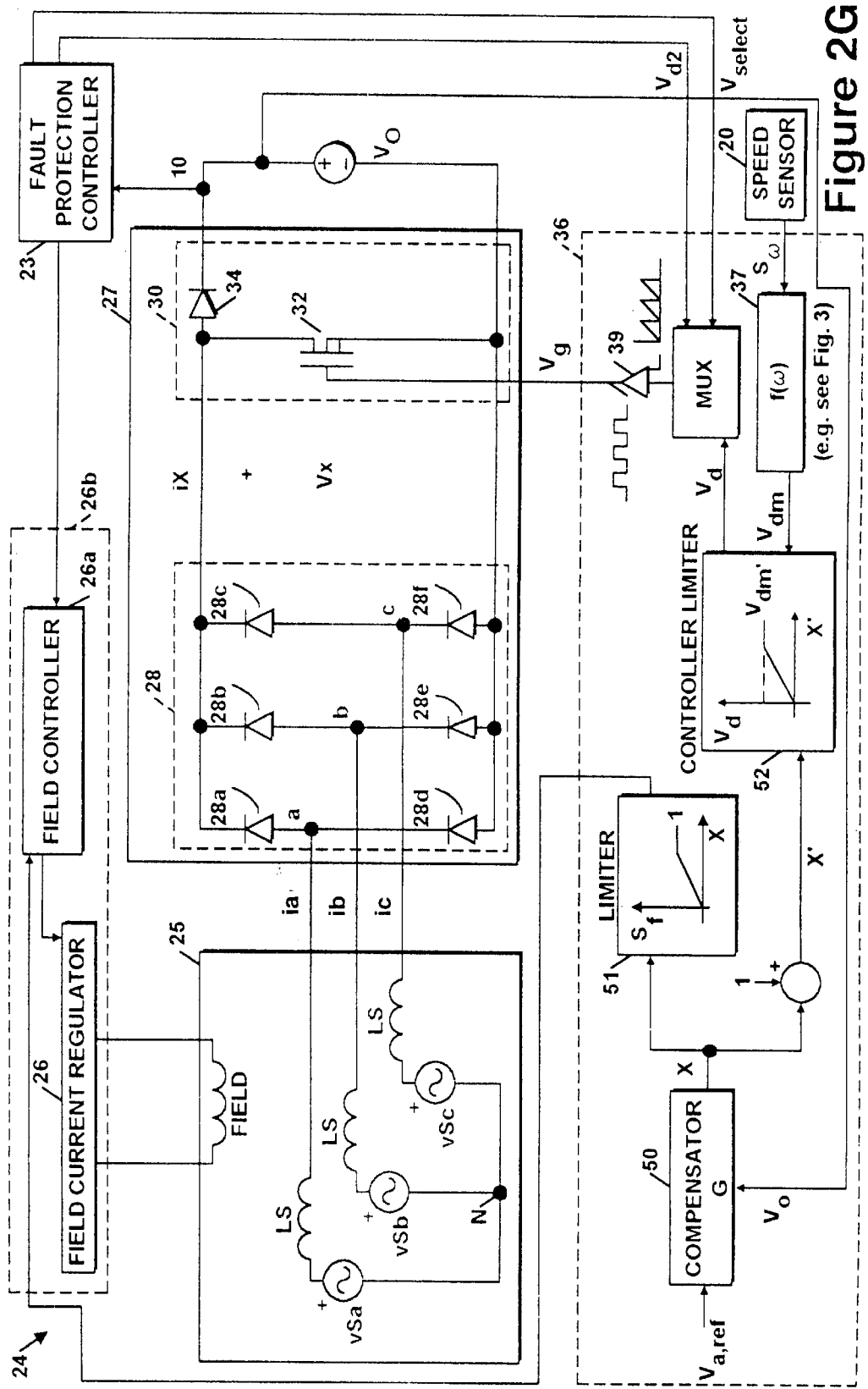
FIG. 2G is a schematic diagram of an alternator system which utilizes compensator and limiter circuits.

Referring now to FIG. 2G, an alternator system 24 which may be similar to alternator system 10 described in conjunction with FIG. 1B includes a wound-field alternator 25 with field control provided by a field current regulator 26 coupled to a field controller 26a. A switched-mode rectifier 27 coupled to the alternator 25 includes a diode bridge coupled to the alternator 25 as shown. Coupled to the diode bridge is a boost switch set or boost stage 30 comprising a controlled switch 32 and a diode 34.

A control circuit 36 coupled to the boost stage 30 and to the field controller 26a generates a pulse width modulation (PWM) gate command with duty ratio d. The control circuit also generates a command, $S_f$, to the field controller. The signal $S_f$ provides the control command for the field winding, and may represent the fraction of full field to apply or alternatively the duty cycle of the field current regulator to use, or an equivalent control signal. The signals $S_f$ and d are determined based on the alternator system output voltage and the alternator speed.

In particular, compensator 50 generates a control signal X based on the desired output voltage and the actual output voltage. Compensator 50 may represent a gain or transfer function working on the difference between desired and actual output voltage or be some other function of actual and desired output voltage. This signal X is fed firstly to a limiter 51 that generates a signal $S_f$ that is a replica of X except that its value is limited between 0 and 1. The signal $S_f$ is provided as a control command to the field current controller, and may represent the fraction of full field to use or field regulator duty cycle to use or some equivalent signal. Signal X is secondly used to generate a signal X' which is X minus 1. X' is fed to controlled limiter 52.

The controlled limiter 52 generates a signal $V_d$ that is a replica of X' except that it is limited between zero and a value $V_{dm}$. The value $V_{dm}$ is generated in the manner described below: Speed sensor 20 generates a signal, $S_T$, that is proportional to alternator speed, and provides this signal to conversion circuit 37. The conversion circuit 37 transforms this signal into a signal $V_{dm}$ which is provided to controlled limiter 52. The conversion circuit 37 calculates the duty cycle for matched operation $d_m$ at full current based on the alternator speed. This may be an empirically-derived function or alternatively may be calculated as:

$$d_m = 1 - \left( \frac{\sqrt{2}\, \pi k i_{f,\max}}{4 V_{o,ref}} \right) \cdot \omega$$

Alternatively still, the relationship may be determined through other functional or empirical relationships.

In this embodiment of the invention, the SMR duty ratio d and the field controller command $S_f$ are jointly determined as a function of output voltage in a manner that allows the high-power operation of the machine to be achieved while reaching a very high part-load efficiency. In many automotive alternators, over much of the speed range the conduction losses in the stator windings and the semiconductor devices represent a dominant portion of the alternator losses. The control scheme of this embodiment reduces the losses incurred by those elements by ensuring that the alternator system generates the needed output power utilizing the lowest stator and device currents possible. This is done by controlling the SMR so that the alternator always sees the largest effective voltage $V_x$ that can be used for that level of output power. For a boost-type SMR, this is done by ensuring that the lowest duty ratio possible (for the required level of output power) is always used. The system of FIG. 2G does this by ensuring that the duty ratio will only be raised above zero when full field current at zero duty ratio is not sufficient to provide the needed output power. In this case the duty ratio will only be raised by an amount necessary to provide the needed output power or to reach the load-matched condition, whichever is lower. The control method thus allows very high efficiency control of the system while providing a simple, inexpensive control structure. Those of ordinary skill in the art will recognize that similar embodiments optionally using other rectifier types may also be used to achieve this control mode (that is, ensuring that the minimum stator and device currents are used for generating the necessary output power).

Figure 5:
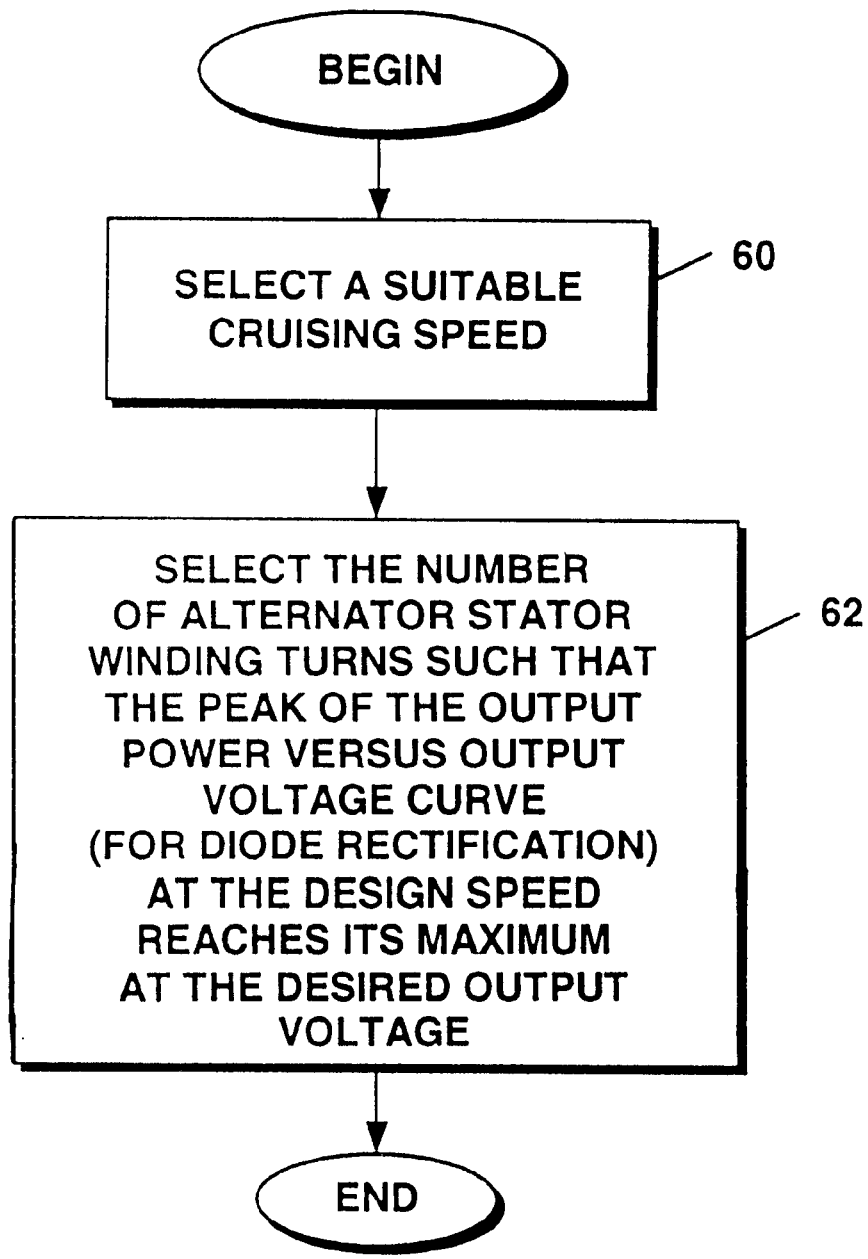
FIG. 5 is flow diagram showing the steps to design an alternator in accordance with the present invention.

Referring now to FIG. 5, a flow diagram illustrating the steps to design an alternator in accordance with the present invention are described. First, as shown in step 60 a suitable cruising speed to design for is selected.

Second, as shown in step 62 the number of alternator stator winding turns is selected such that the peak of the output power versus output voltage curve (for diode rectification at full field) at the design speed reaches its maximum at the desired output voltage.

Thus, in accordance with the present invention conventional alternator designs can be adjusted by rewinding the alternator with a number of turns so that at or near maximum cruising speed, maximum power is achieved at the desired output voltage. This is in contrast to conventional designs in which the maximum power is achieved at the desired output voltage at idle speed.

It should be noted that there are other more sophisticated modifications that can be made to an alternator for good operation in accordance with the present invention, such as reoptimizing the magnetic and thermal design of the alternator. Fully reoptimizing the alternator for this new approach (e.g. redesigning the magnetics, thermal design, etc.) is expected to yield good results for alternators providing output at any output voltage.

While FIGS. 2, 2D, 2F, 2G, and 4 show versions of the invention with simple "boost-type" switched-mode rectifiers, other simple rectifier structures can also be used to implement the new invention. Thus, several alternative rectifier structures are described below in conjunction with FIGS. 6–10.

Figure 6:
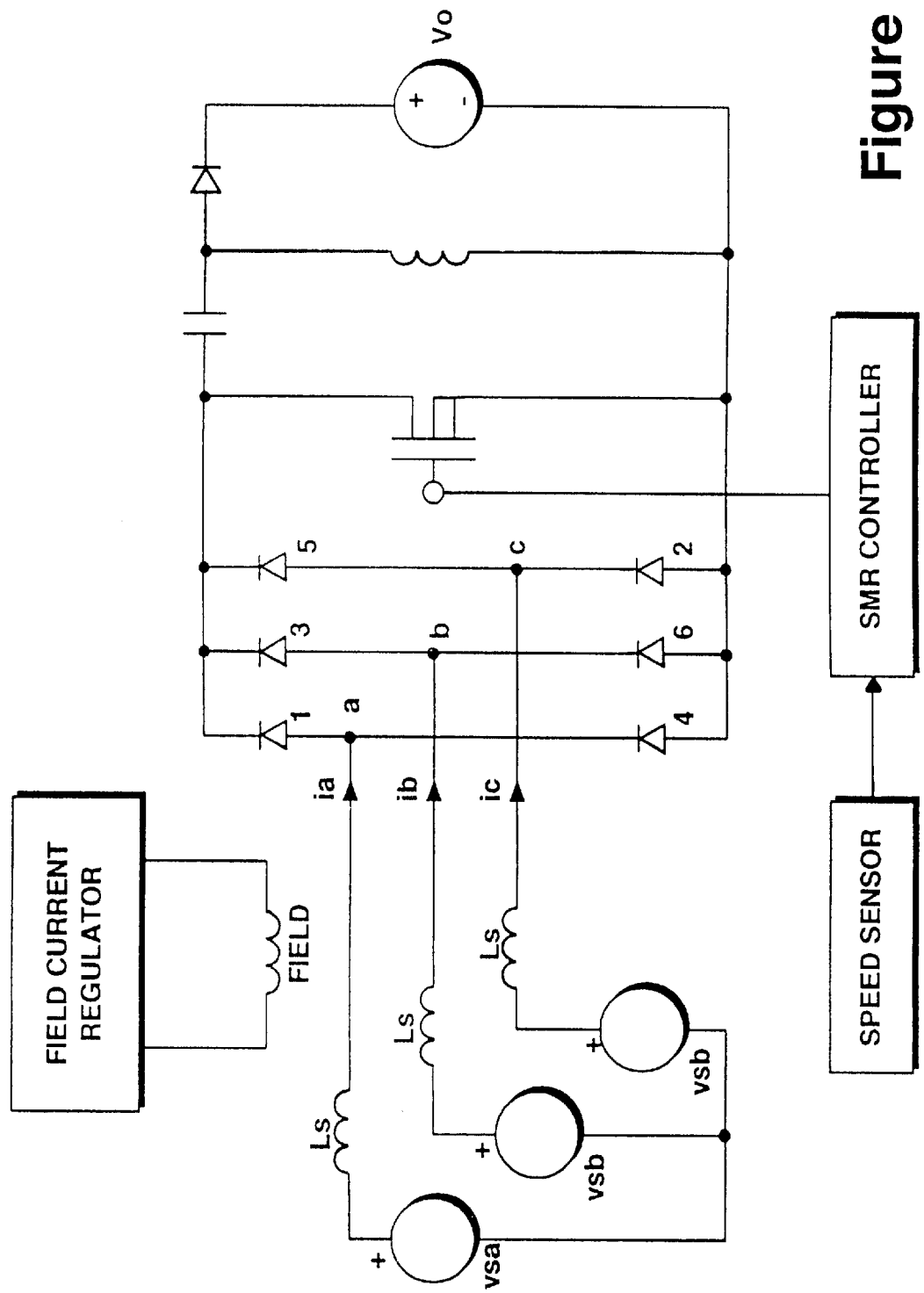
FIGS. 6–10 are series of schematic diagrams illustrating different types of switched-mode rectifier circuit topologies which can be used in accordance with the present invention.
Figure 7:
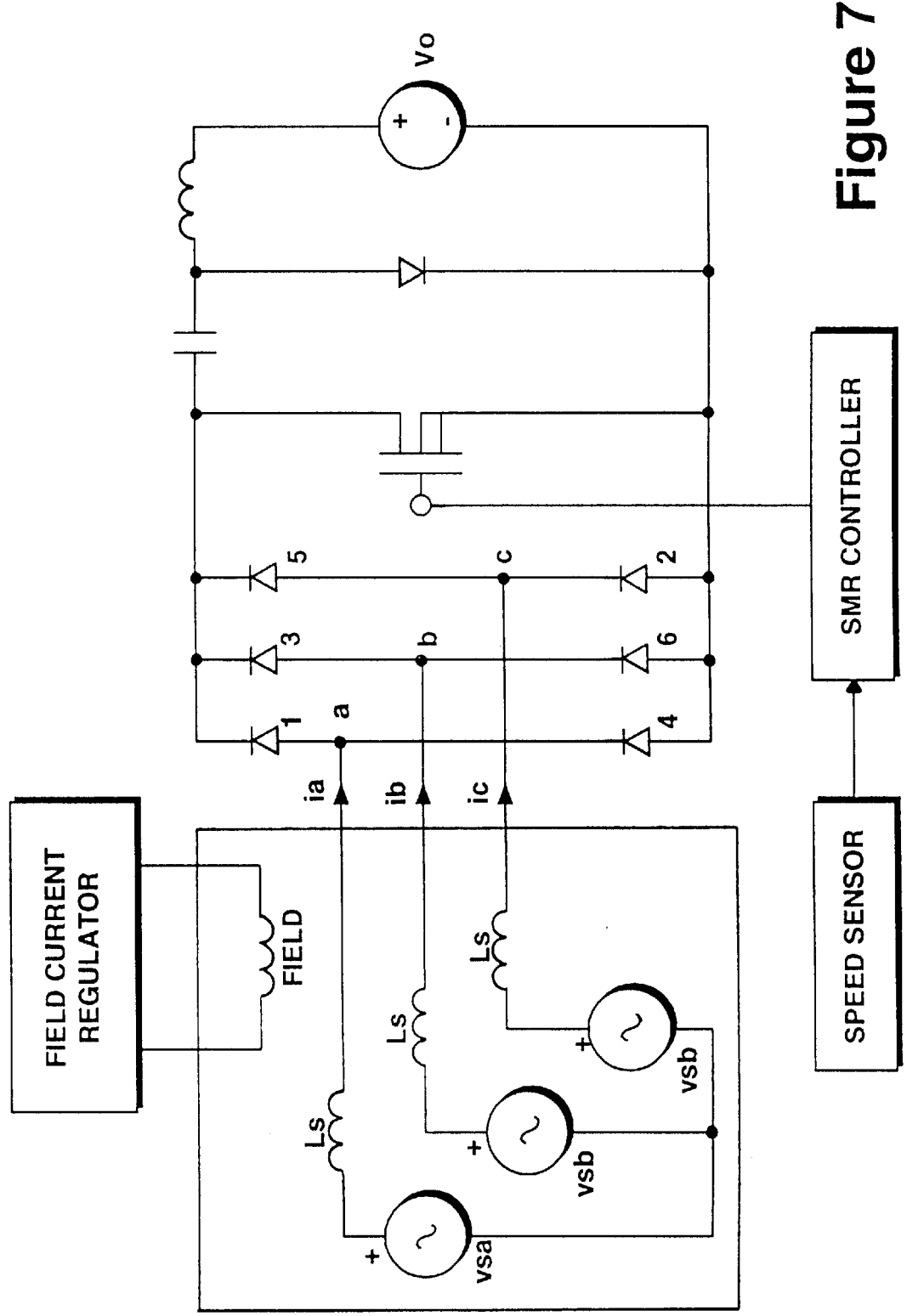
Figure 8:
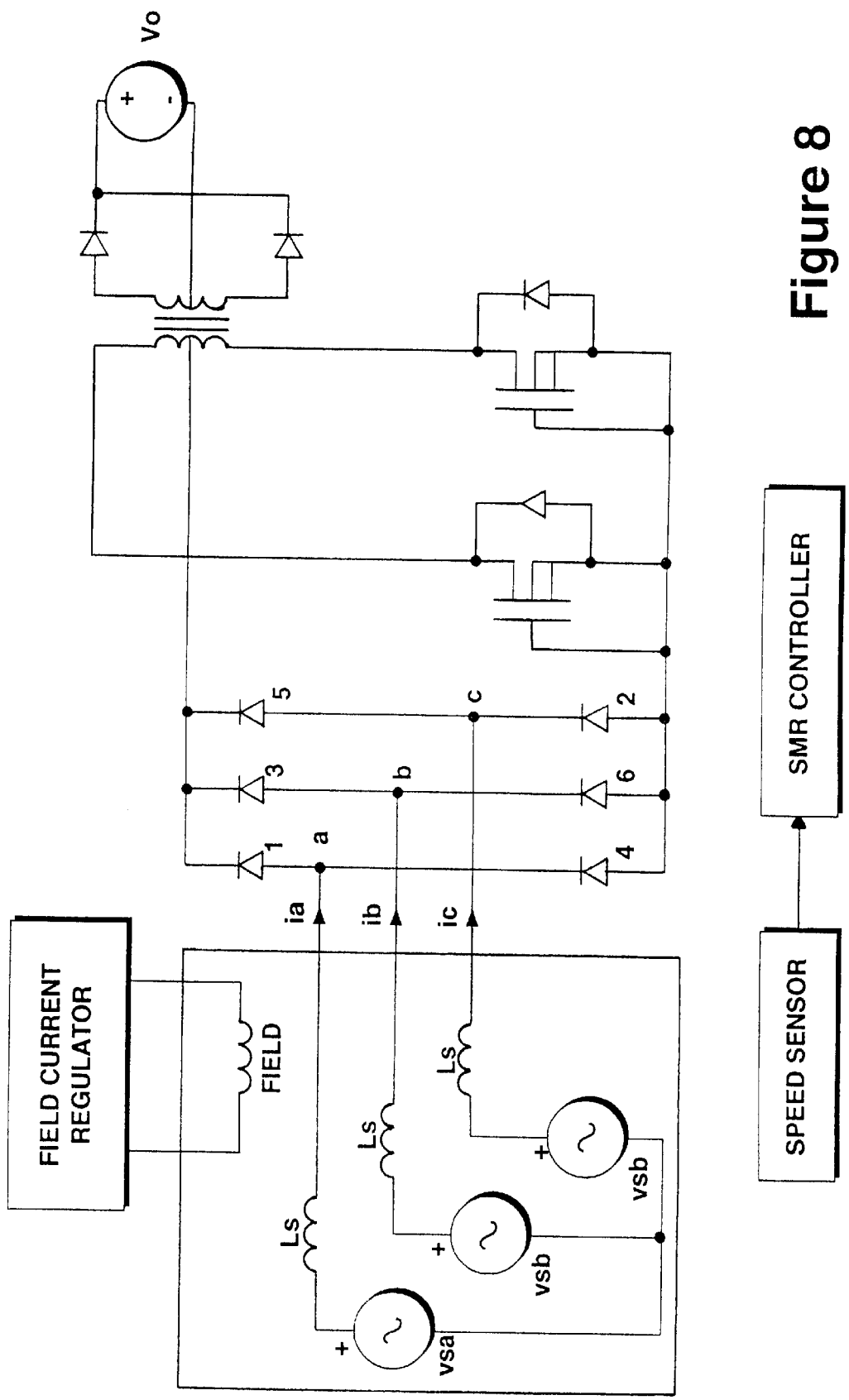
Figure 9:
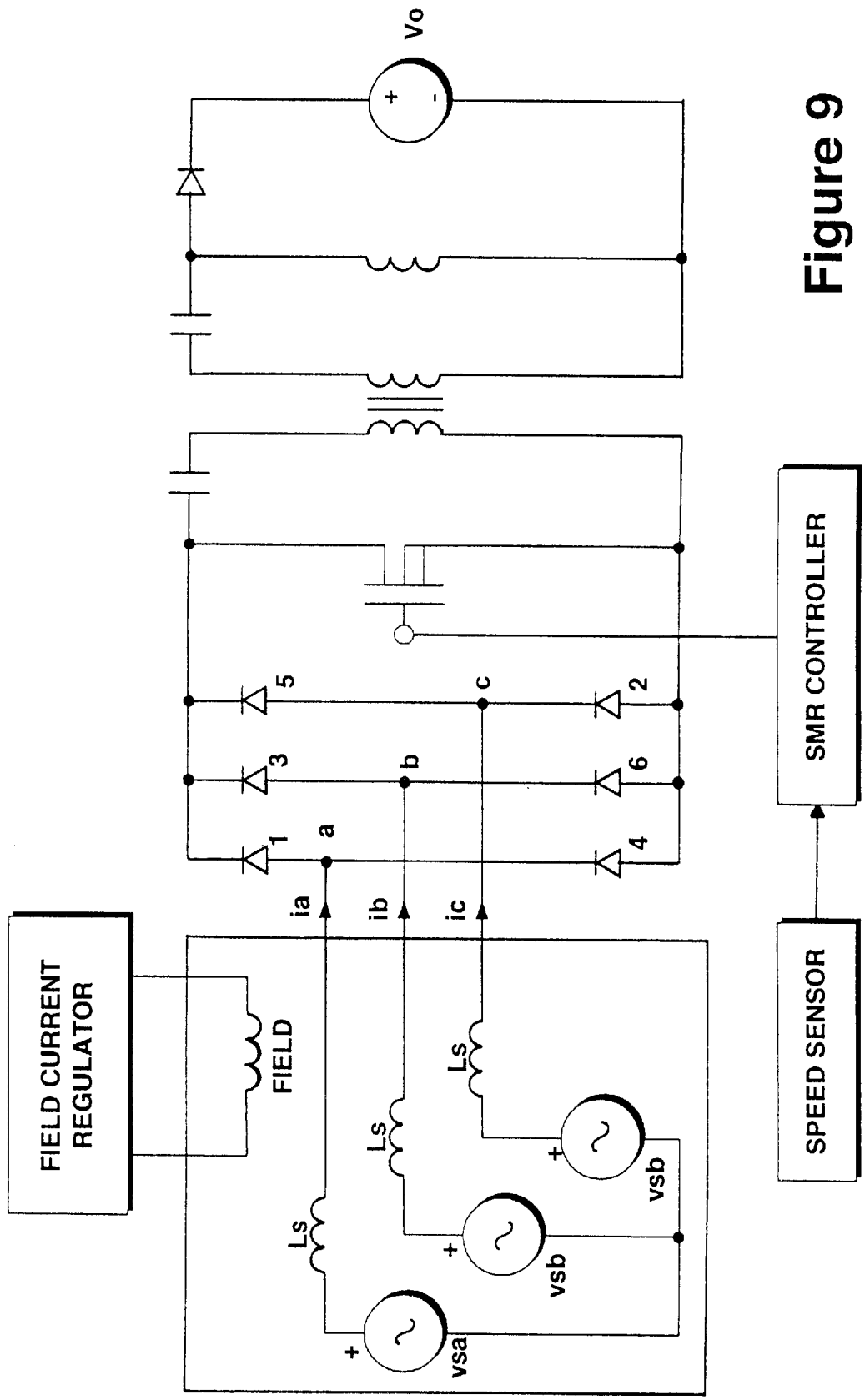
Figure 10:
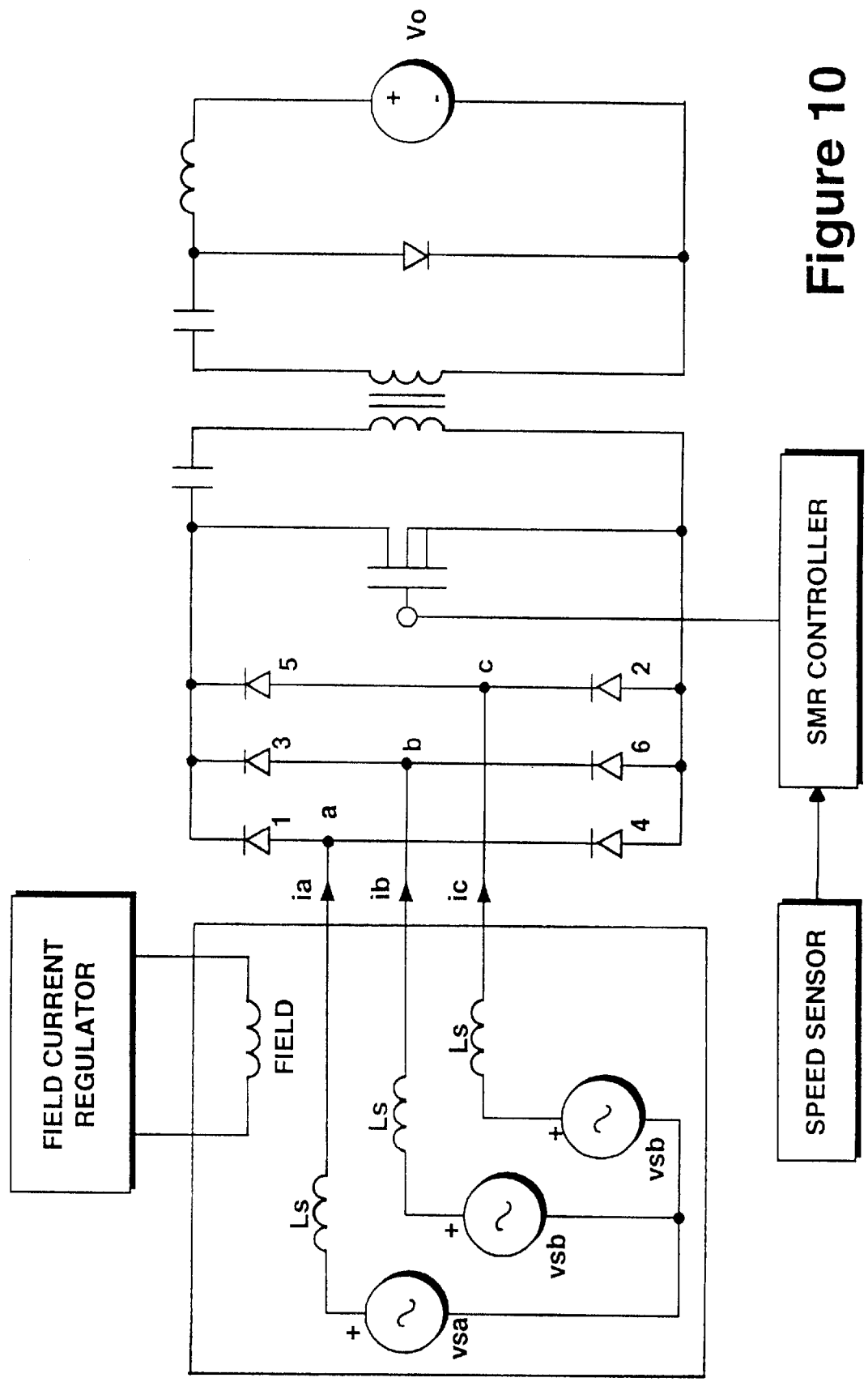

For example, FIGS. 6, 7 and 8 illustrate alternate embodiments of the invention with SEPIC, Cuk, and current-fed push-pull versions of the switching rectifier. Isolated versions of the rectifiers, such as illustrated in FIGS. 9 and 10, can also be used. In these embodiments, the duty ratio control laws will be different than those of the systems using a boost rectifier. However, appropriate duty ratio control laws for achieving load matching with these rectifier circuits are easily derived by determining the duty ratio necessary to properly match the average alternator voltage to the output voltage Vo as a function of speed and field current or equivalently as a function of back voltage. Several examples have been provided above for particular embodiments. It should be appreciated, however, that particular relationships between the average alternator voltage and output voltage Vo, speed, field current, and back voltage will depend upon particular embodiments and that the examples provided herein are exemplary only and should not be construed as limiting the scope of the general concept of the invention in any way.

The ability to achieve load dump suppression is also retained in these alternative rectifier structures. The SEPIC-based rectifier used in FIG. 6 can provide an effective transformation ratio greater than or less than one by varying duty ratio, as can the rectifiers of 7, 9, and 10. The rectifier of FIG. 8 can also do this, but only through proper selection of the transformer turns ratio. The Cuk-based rectifier used in FIG. 7 provides smoothed output current and natural output voltage inversion, in cases where that is desirable. The push-pull based rectifier used in FIG. 8 provides isolation and additional degrees of design freedom through incorporation of a high-frequency transformer, as do the rectifiers used in FIGS. 9 and 10.

It should be noted that while all of these rectifier topologies have been proposed previously (such as in an article entitled *"Single-Switch 3ϕ PWN Low Harmonic Rectifiers,"* by E. H. Ismail and R. Erickson in the IEEE Transactions on Power Electronics Vol. 11, No. 2, March 1996, pp. 338–346), they have not been applied in the manner of the present invention.

In the present invention these switching rectifiers are used to provide an additional control handle to extract much higher levels of performance and power from the alternator, as described previously for the boost-derived topologies of FIGS. 2 and 4. By adjusting the switching duty cycle d, the alternator can generate up to its maximum power (across voltage) as speed varies while supplying a constant output voltage; this is possible because the switched-mode rectifier makes the necessary controlled voltage transformation. It should be noted that the duty ratio control laws used to achieve the desired effect are different for these topologies than for the boost-derived rectifiers, but are easily determined. Use of these alternative rectifier structures also preserves other advantages of the invention such as the ability to implement load dump suppression.

Figure 11:
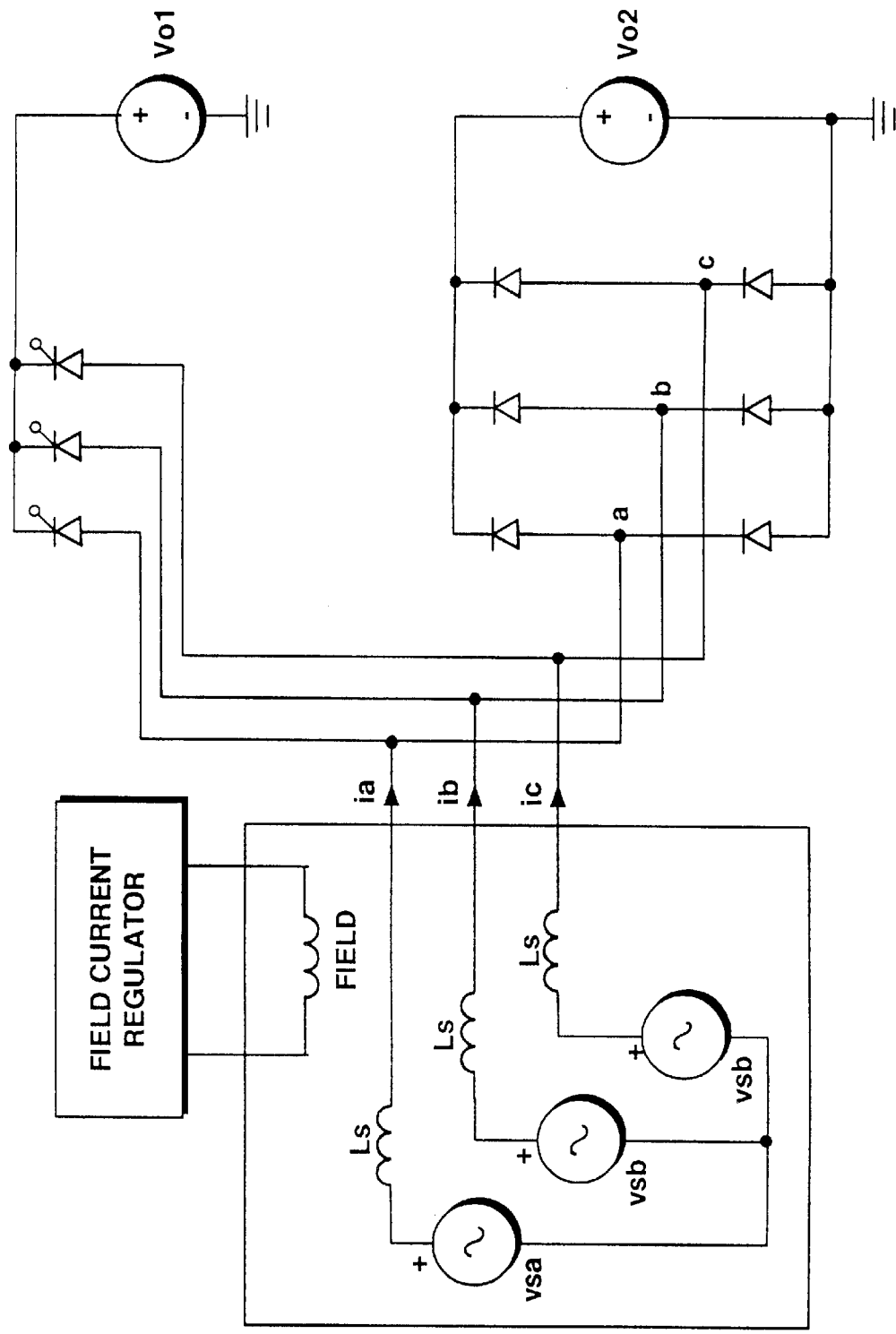
FIG. 11 is a schematic diagram of a prior art dual-rectified alternator system.
Figure 12:
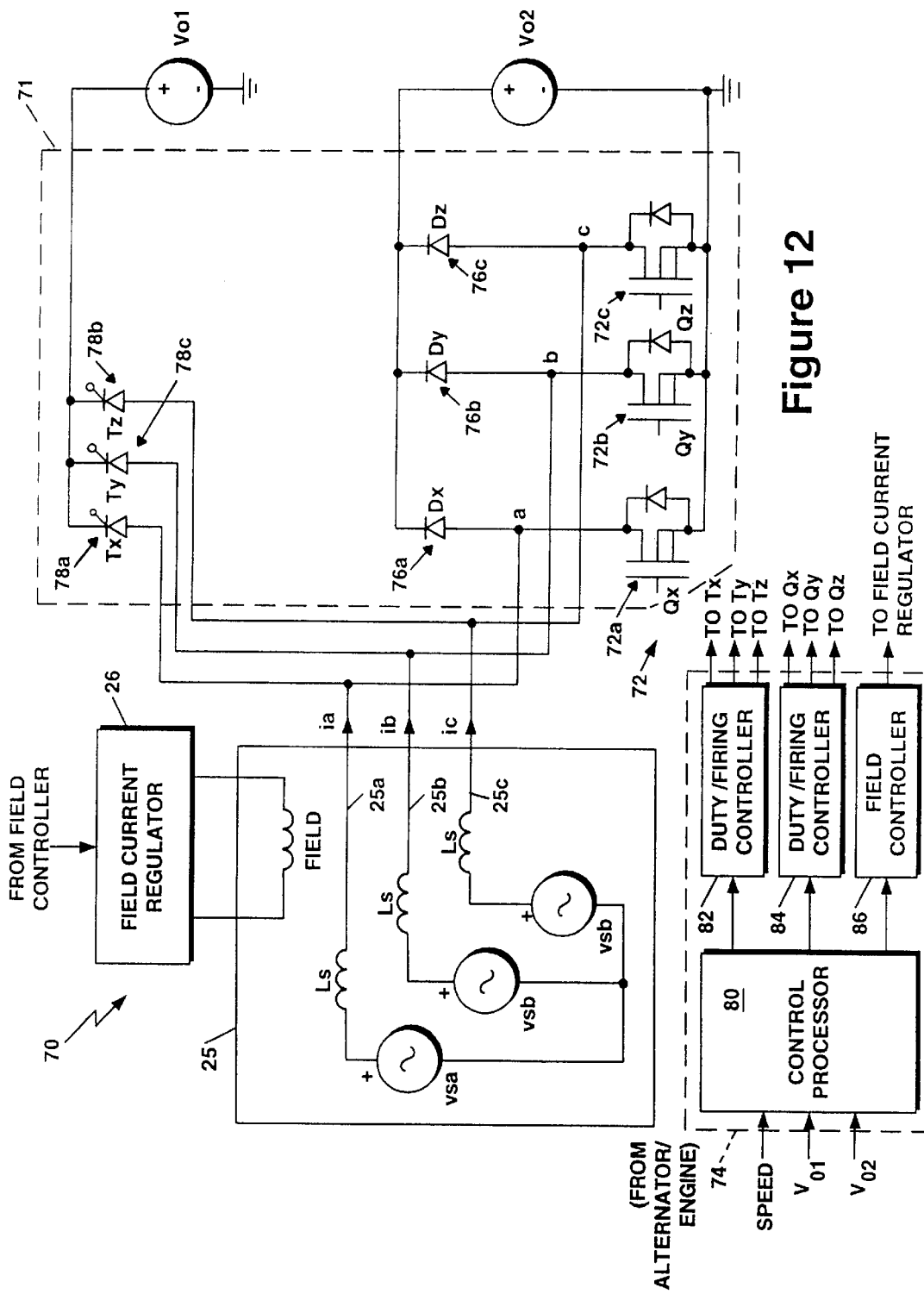
FIG. 12 is a schematic diagram of a dual-rectified alternator system which operates in accordance with the principles of the present invention.
Figure 13:
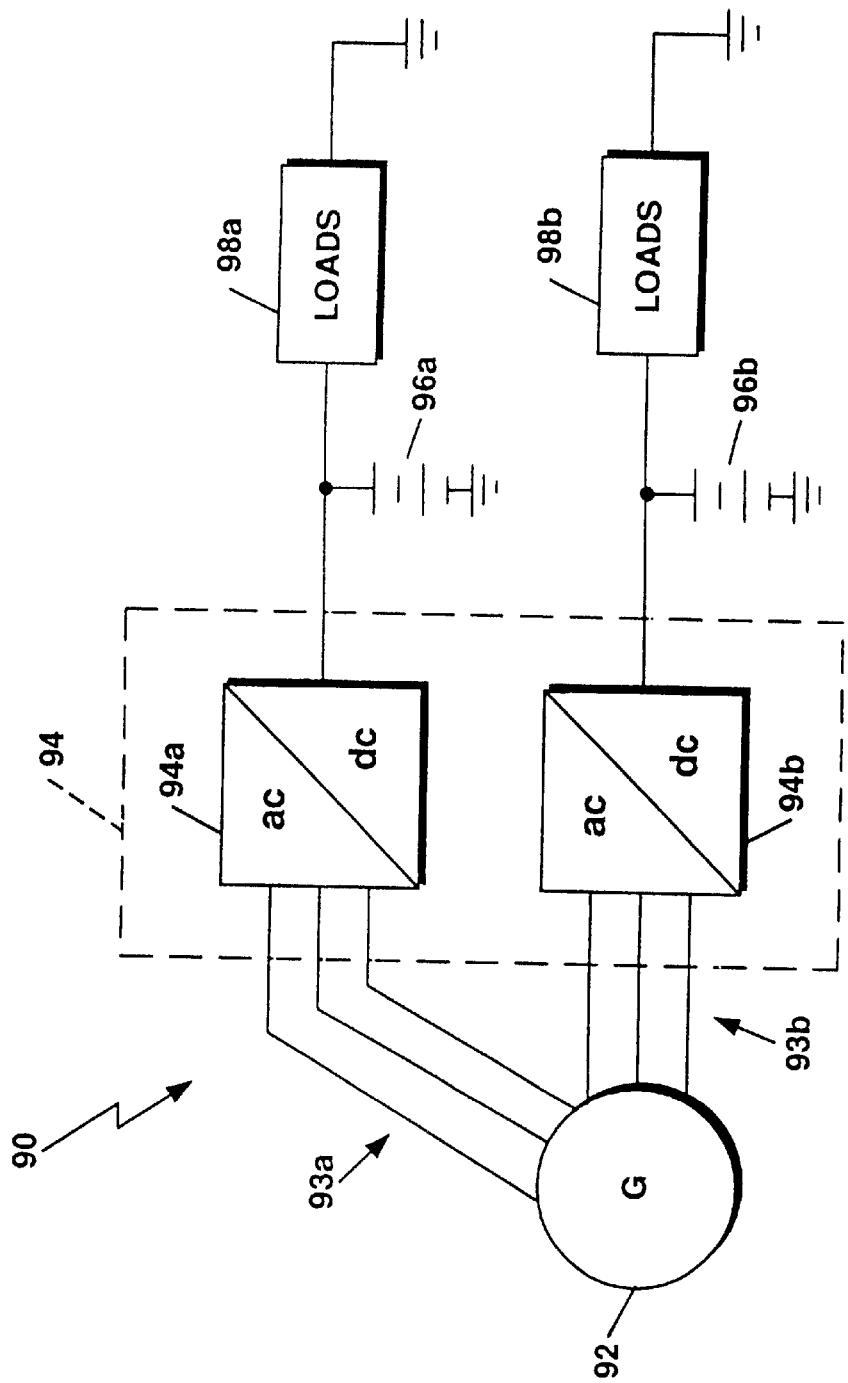
FIG. 13 is a block diagram of a dual-output alternator system using a dual wound alternator machine.

FIGS. 11–13 illustrate Dual-Output Alternator Configurations. A dual-output alternator system has two outputs which must be regulated. A number of methods for achieving this are possible.

One prior art approach often-considered for a dual-output rectifier topology is illustrated in FIG. 11. In this system field control is used to regulate the high-voltage output (fed via the high-side diodes), while firing angle control (within the machine electrical cycle) is used to regulate the low-voltage output (fed via the thyristors).

Referring now to FIG. 12, a dual output alternator system 70 includes an alternator 25 having a field current regulator and field controller 26, 26a coupled thereto. Alternator output terminals 25a, 25b, 25c have a first set of switching elements 72a, 72b, 72c generally denoted 72 coupled thereto. In this particular embodiment, the switching elements 72 are provided as MOSFETs having a first terminal coupled to a respective one of the alternator output terminals 25a, 25b, 25c, second terminals coupled to a reference potential (here shown as ground) and a control terminal which receives control signals from a control system 74.

Also coupled to the alternator output terminals are a series of diodes 76a, 76b, 76c with each of the diodes having a first terminal coupled to the alternator output terminals 25a, 25b, 25c and the first terminals of the MOSFETs 72a, 72b, 72c and second terminals coupled to an output terminal of the alternator system.

The dual output alternator system 70 also includes a plurality of thyristors 78a, 78b, 78c. It will be recognized by those of ordinary skill in the art that the thyristor devices may be replaced by different switching elements that can achieve the desired effect. Such alternative implementations include the use of diodes in series with MOSFET switches (or a set of three diodes with one MOSFET connected to their cathodes) or the use of MOS-controlled thyristors (MCTs). The thyristors 76a, 76b, 76c receive control signals from the control system 74 which biases the thyristors between their conduction and non-conduction states. Thus, in this particular embodiment, the alternator 25 provides power to a first high voltage bus through switched-mode rectifier 71 and also provides power to a second low voltage bus through thyristors 78a–78c.

In this particular embodiment, the control system 74 includes a control processor 80 which receives input signals corresponding to speed, and the dual output voltages $V_{O1}$, $V_{O2}$ and provides signals to a first duty/firing controller 82, a second duty/firing controller 84 and a field controller 86. It should be appreciated that although the control system 74 is here shown provided from a plurality of different controllers and processors, it should be appreciated that the control system could also be implemented as a single controller or processor 74 which provides all the functions performed by processor 80 and controllers 82, 84, 86.

The processor 80 receives the output voltage signals $V_{o1}$, $V_{o2}$ and as well as a speed signal and determines a duty ratio and pre-processes the voltages $V_{o1}$, $V_{o2}$ and provides the pre-processed signals to the field controller. The first duty/firing controller 82 provides control signals to the gate terminal of the thyristors 78a, 78b, 78c to bias the thyristors into their conduction states. The thyristors turn off when a reverse voltage is applied across the anode and cathode of the thyristor.

The control system 74 controls the dual output alternator system 70 as follows: within each switching cycle MOSFETs $Q_x$, $Q_y$, $Q_z$ (or other switching devices having appropriate characteristics) are gated on together for a duty ratio d. After they are turned off, the machine current will flow through one or more diodes $D_x$, $D_y$, $D_z$, feeding current to the high-voltage output. After a controlled delay $d_2$, thyristors 78a–78c are fired, which redirects the machine current to feed the low-voltage bus. (Alternative control methods are possible in which the thyristors are only fired on some switching cycles.) Three control handles are available: the duty cycle of the MOSFETs $Q_x$, $Q_y$, $Q_z$ (gated together) provides one control handle, the second delay of the thyristors $d_2$ provides a second, and field control provides a third control handle. In alternative control methods where the thyristors are only fired on some switching cycles, the fraction of cycles on which the thyristors are fired can replace the controlled delay $d_2$ as the last control handle. Together, these control handles are sufficient to allow regulation of the two outputs while simultaneously controlling the local average voltage the machine sees so that maximum power can be extracted.

For example, one could control field current so that the total current needed at both outputs $V_{O1}$, $V_{O2}$ is supplied by the ac machine 25, control the delay d2 so that the total current is split between the two busses as desired to satisfy the two outputs and control the SMR duty ratio based on the speed, output voltages (or their desired values), commanded field current, and d2 so that the load matching requirement for high power is met. By analogy to the discussion presented above for the single output case, and described above in conjunction with FIGS. 1–4, the SMR duty ratio is selected so that the time average voltage presented at the alternator machine terminals results in the peak of output power vs. alternator voltage being selected.

Another important advantage of this dual-output alternator system 70 is that the PWM operation of the MOSFETs allows switching of current back and forth between the diode and thyristor outputs to occur at the switching frequency. In contrast, in the prior art system of FIG. 11, switching of current back and forth between the diode and thyristor outputs occurs at a low multiple of the machine frequency. This dramatically reduces the size of filters used on the outputs to attenuate ripple. Although not explicitly shown in FIG. 12, it should be appreciated that the dual output alternator system 70 could also include a fault protection control circuit of the type described above in conjunction with FIGS. 1, 1A, 1B and 2. Thus, the circuit architecture of the system 70 also preserves the ability to control load dump transients.

Also described are other dual-output extensions to the invention. If a switched-mode rectifier stage with a transformer is used (such as the isolated Cuk, isolated SEPIC, or push-pull based rectifier as shown in FIGS. 8–10 above), a second output can be supplied through the use of an additional transformer winding. Because the transformers in these versions of the present invention are designed for switching-frequency operation, they can be relatively small and inexpensive. Rectification on the second winding may be provided with thyristors (maintaining the same number of control handles) or with diodes if the transformer turns ratios are selected properly and the resulting cross-regulation between the two output voltages is acceptable.

Figure 12A:
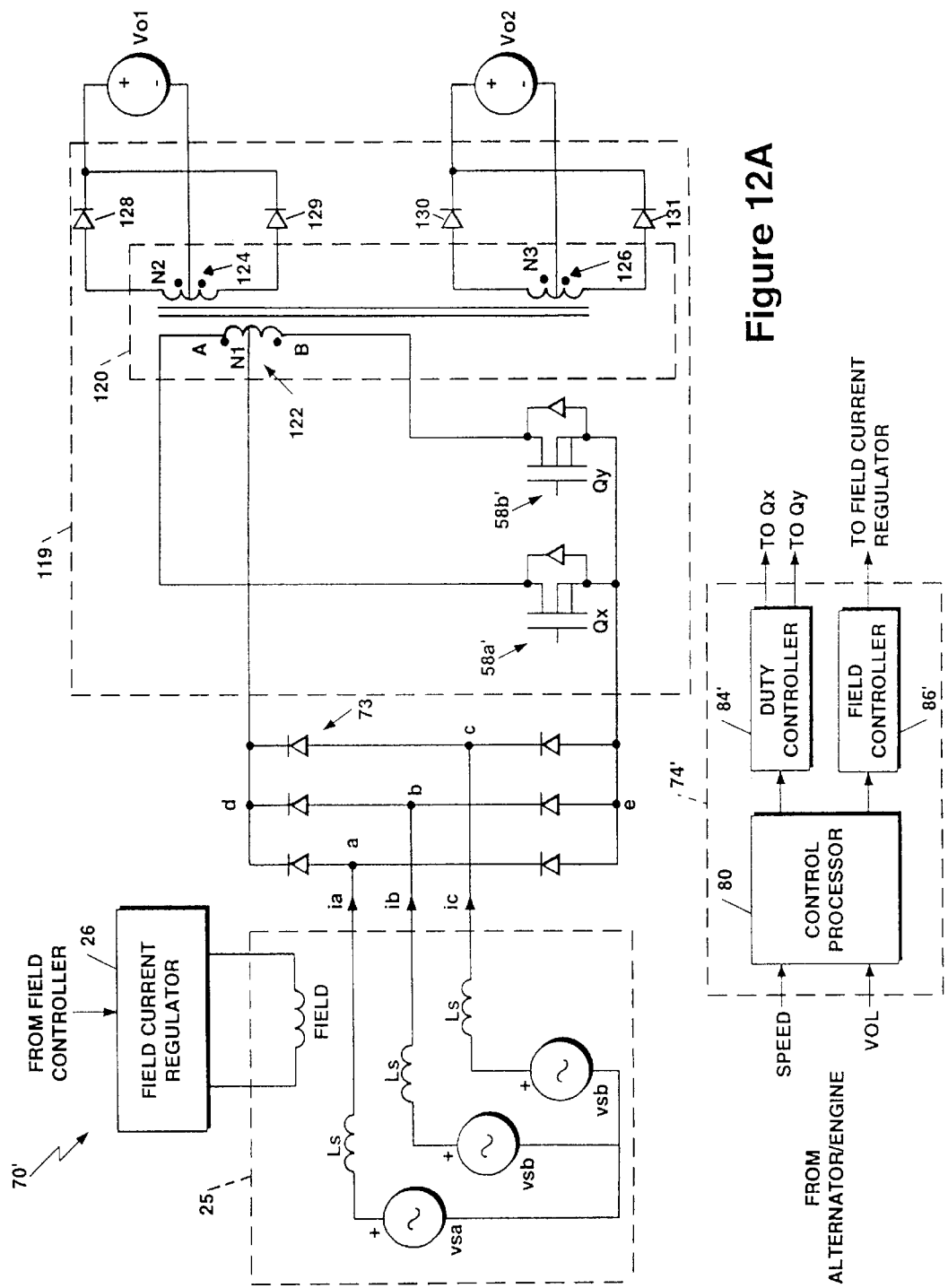
FIG. 12A is a schematic diagram of a dual-rectified alternator system having a control system which receives a pair of input signals.

Referring now to FIG. 12A, a dual output alternator system 70' includes an alternator 25 having a field current regulator 26 coupled thereto. Alternator output terminals 25a, 25b, 25c have a first set of switching elements generally denoted 73 coupled thereto. In this particular embodiment, the switching elements 73 are provided as a plurality of diodes coupled in a full bridge configuration. The bridge is coupled to a switched mode converter 119.

In particular, terminal e of the diode bridge 73 is coupled to first terminals of switching elements 58a', 58b' and terminal d of the diode bridge is coupled to a transformer 120. In this particular embodiment, the switching elements 58a', 58b', are provided as MOSFETs each having first terminals (here corresponding to source terminals) coupled to terminal e of the diode bridge 73.

The transformer 120 includes a primary transformer winding 122 having N1 turns. Terminal e of the diode bridge is coupled to the center tap of the primary transformer winding 122 while second terminals (here drain terminals) of the switches 58a' and 58b' are coupled to opposite ends of the primary transformer winding 122. The transformer 120 also includes secondary windings 124, 126 having turns N2, N3 respectively. The secondary winding 124 is connected with diodes 128 and 129 to output voltage $V_{O1}$ and secondary winding 126 is connected with diodes 130 and 131 to the output voltage $V_{O2}$. The turns ratios N1/N2 and N1/N3 are chosen to have the desired voltage levels $V_{O1}$ and $V_{O2}$.

The switches 58a', 58b' also have third or control terminals (here gate terminals) which receive control signals from a control system 74'.

In this particular embodiment, the control system 74' includes a control processor 80 which receives input signals corresponding to speed and the output voltage $V_{O1}$. It should be appreciated that although the voltage $V_{O1}$ is used in this particular example, the voltage $V_{O2}$ could alternatively be used. Thus, the control processor 80 can receive input signals corresponding to speed and one of the output voltages $V_{O1}$ or $V_{O2}$.

The control processor 80' provides control signals to duty controller 84' and field controller 86'. It should be appreciated that although the control system 74' is here shown provided from a plurality of different controllers and processors, it should be appreciated that the control system 74' could also be implemented as a single controller or processor 74' which provides all the functions performed by processor 80 and controllers 84' and 86'.

In operation, the control system 74' receives the speed signal and the output voltage signal $V_{o1}$. The control system 74' determines a duty ratio for the switches 58a', 58b' from the speed signal and provides switch control signals to the switches 58a, 58b through the duty controller 84'. The control system 74' also pre-processes the voltage $V_{o1}$, and provides the pre-processed signal to the field controller 86' which in turn provides field control signals to the field current regulator 26 which controls the output voltage level provided by the alternator 25.

The control system 74' controls the dual output alternator system 70' as described below. Each of the MOSFETs 58a', 58b' (or other switching devices having appropriate characteristics) receive control signals from the duty controller 84'. The control signals cause the MOSFETs 58a', 58b' to be either on or off.

During at least a portion of the switching cycle, the FET 58a', is turned on, and FET 58b' is turned off. In this case, current flows through section A of the primary winding 122 and through MOSFET 58a. Current flows in the secondary windings 124, 126 through diodes 128 and 130 respectively to deliver power to the output voltages $V_{O1}$, $V_{O2}$.

During at least another portion of the switching cycle, the FET 58a', is turned off, and FET 58b' is turned on. In this case, current flows through section B of the primary winding 122 and through MOSFET 58b'. Currents flow in the secondary windings 124, 126 through diodes 129 and 131 respectively to deliver power to the output voltages $V_{O1}$, $V_{O2}$.

It should be noted that switching profile of MOSFETS 58a' and 58b' must always provide a flow path for current directed into the center tap of the primary winding 122 of transformer 120. As a result, it must be ensured that switches 58a' and 58b' are never off simultaneously. To guarantee that MOSFETs 58a' and 58b' are never off together, there are intervals during the switching interval where both switches are on. These intervals are utilized for the switches to transition from there on states to their off states, or vice versa. For example, consider the case where MOSFET 58a' is on and MOSFET 58b' is off. Before turning MOSFET 58a' off and MOSFET 58b' on, MOSFET 58b' is turned on. During the interval both MOSFETs are on, the current flowing into the center tap of primary winding 122 of transformer 120 divides equally between section A and section B of primary winding 122. Furthermore, during this interval no current flows in the secondary windings 124 and 126 of transformer 120. The overlap on-time of the MOSFETs is chosen to allow smooth switch state transitions (on to off or off to on) for the switches while accounting for the finite state transition times for practical devices chosen for the particular application. The selected overlap time also provides the mechanism for controlling the average voltage across terminals d and e.

Together, these control handles are sufficient to allow regulation of the two outputs $V_{O1}$, $V_{O2}$ while simultaneously controlling the local average voltage the machine sees so that maximum power can be extracted.

The output voltage $V_{O1}$ is proportional to the turns ratio N2/N1 and output voltage $V_{O2}$ is proportional to N3/N1. It can be shown that the constant of proportionality for $V_{O1}$ and $V_{O2}$ is identical and is a function of the duty ratio of the switches and the local average of the voltage across terminals d and e. As a result, it follows that voltages $V_{O1}$ and $V_{O2}$ are related by the turns ratio N2/N3 and are not both independent variables. Therefore, it suffices to use either $V_{O1}$ or $V_{O2}$ as the variable to be controlled in our control system 74'. With one of the two voltages chosen to be controlled, choosing the correct turns ratio N2/N3 indirectly controls the other variable.

Referring now to FIG. 13, a dual-output alternator system 90 implemented using dual-wound alternator 92 is shown. In such alternator systems, separate machine windings 93a, 93b are used with separate rectifiers 94a, 94b to supply two outputs 96a, 96b to which are coupled loads 98a, 98b. The present invention can be extended to this case by using a simple switched-mode rectifier with the appropriate control for one or both of the rectifiers 94a, 94b in the dual-wound alternator system. In addition to allowing increased power output and load dump control, this variant of the new invention allows more freedom in the design of the alternator machine 92 because of the degrees of freedom provided by duty-cycle control of the rectifier(s) 94a, 94b.

Figure 14:
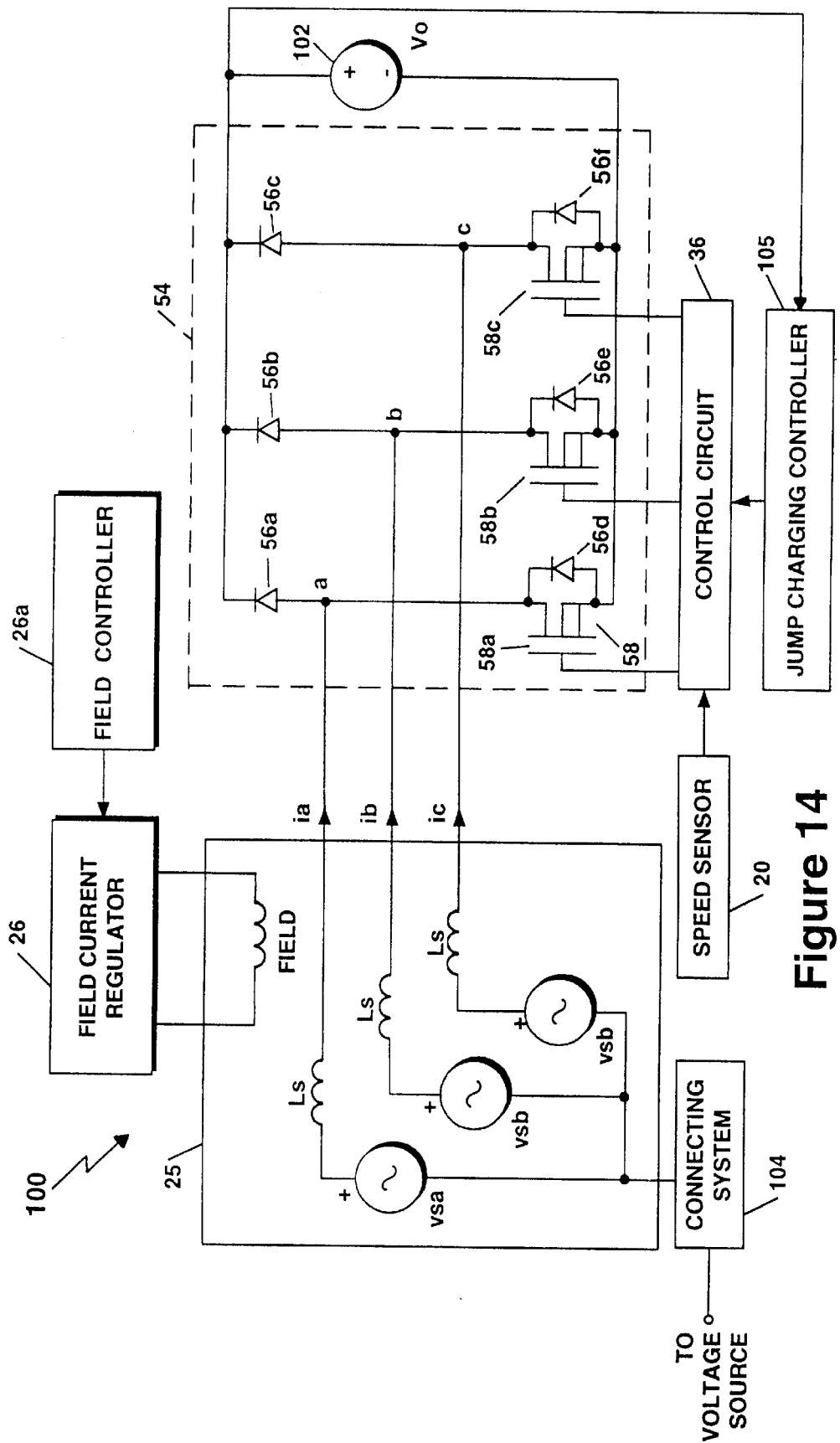
FIG. 14 is a is a schematic diagram of an alternator system including a means for selectively connecting a low-voltage source to a neutral of an ac machine.

Referring now to FIG. 14, an alternator system 100 which includes circuitry to enable a method for charging a battery 102 at the output of a switched-mode rectifier 54 includes a connecting system 104 for selectively connecting the positive terminal of a charging source (not shown) to an ac machine.

In this particular example, connecting system 104 is coupled to the machine neutral point. It should, however, be appreciated that the connecting system could also be coupled to portions other than the machine neutral. For example, it could be connected to one of the phase outputs. In this manner all or a portion of the machine inductances can be utilized with all or a portion of the SMR as a switching power converter to charge the battery from the charging source. Thus, in the case where the connecting means is coupled to one of the phase outputs (rather than the machine neutral) the corresponding portion of the SMR coupled to that particular output would not be used (e.g. turned off).

It should be appreciated that in those embodiments described herein which include a jump charging circuit a switching converter or an inverter could be substituted for the switched-mode rectifier 54. Thus, in some embodiments it may be desirable or even necessary to replace the switched-mode rectifier 54 with a switching converter or an inverter. In those applications in which a switching power converter or inverter is used, the SMR control circuit is replaced by appropriate control circuitry.

Connecting system 104 can be provided, for example, as a connector or a switch (such as a mechanical switch, relay, or semiconductor switch), or by another connecting means. In one embodiment, the battery 102 is provided having a first voltage level and the voltage source coupled to connecting system is provided having a second voltage level which is lower than the voltage level of the battery 102. Thus, in this case, the battery 102 corresponds to a high voltage source and the charging source coupled to connecting system 104 corresponds to a low voltage source.

The negative terminal of the low-voltage source is connected to system ground as is the negative terminal of the high-voltage battery 102. In this configuration the alternator machine inductances in conjunction with the switched-mode rectifier can be used as a boost dc/dc converter to charge the high-voltage battery 102 from the charging source.

When the MOSFETs 58a–58c are turned on, the current in the machine inductances increases, drawing energy from the low-voltage source and storing it in the machine inductances. When the MOSFETs 58a–58c are turned off, some of this energy plus additional energy from the low-voltage source is transferred to the high-voltage battery 102 through the diodes 56a–56c.) The high-voltage battery 102 may be charged from a low-voltage source (for jump-starting purposes, for example) using this method.

It should be recognized that this approach may also be utilized in dual-voltage systems such as the system described below in conjunction with FIG. 15. In the case of a dual-voltage system, the low-voltage source may be the low-voltage battery of the same vehicle, or it may be supplied from a different vehicle or source. Again, a means is provided for selectively connecting the alternator machine neutral to the desired low-voltage source. In a dual-voltage system charging from its own low-voltage battery, this connection may be conveniently provided by a relay connecting the machine neutral to the positive terminal of the low-voltage battery, for example.

A jump charging controller 105 couples a portion of the output voltage Vo (or in some embodiments it may be desirable or preferable to couple a portion of the output current or both the output voltage and the output current) and provides a control signal to the control circuit 36. The circuit 105 regulates the output voltage Vo by changing the duty ratio of the switched mode rectifier circuit 54 to obtain a desired output voltage or current to charge the battery. It should be noted that often in the case where it is necessary to utilized this mode of operation, the associated engine and thus alternator will not be running and thus the speed sensor 20 would provide a control signal corresponding to zero alternator rpms.

It should be appreciated that although the alternator 25 is here shown as a field controlled alternator controllable via field current regulator 26 and field controller 26a, in those cases where speed sensor 20 can be omitted, the alternator can be provided as a so-called permanent magnet alternator. In this case, the output voltage is controlled via the SMR control circuit using known techniques.

Figure 15:
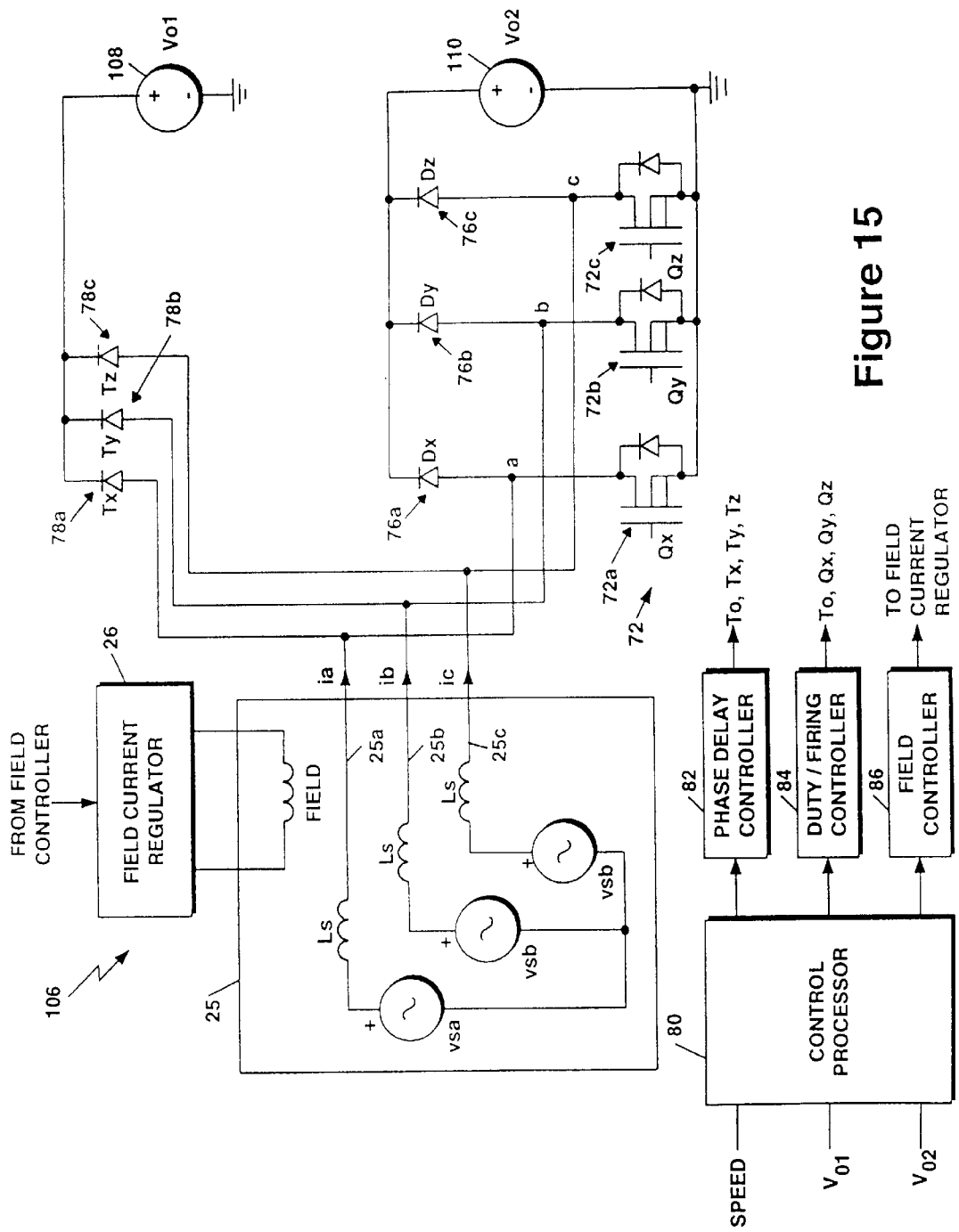
FIG. 15 is a schematic diagram of a dual winding alternator system including a means for selectively connecting a low-voltage source to a neutral of an ac machine.

Referring now to FIG. 15, a dual voltage system 106 which may be similar to the system 70 described above in conjunction with FIG. 12 includes a connecting system 104, a first voltage source or battery 108 and a second voltage source or battery 110. The connecting system 104 can be used to implement a method for charging the battery 110 at the output of the dual-rectified dual-controlled alternator system 106. The connecting system 104 may be provided as the type described above in conjunction with FIG. 14. In this case, the thyristors 78a–78c are not turned on, and the MOSFETs are used in conjunction with the machine inductance to allow charging of the high-voltage battery from the low-voltage charging source.

It will be now recognized by those of ordinary skill in the art that this same approach may be used with other switched-mode rectifier structures, such as the alternative boost, Cuk, SEPIC, and push-pull rectifier structures described above in conjunction with FIGS. 6–10. For the rectifier systems described in FIGS. 6–10, the charging source voltage may be either greater or less than the voltage of the battery being charged. Those of ordinary skill in the art will also recognize that other machine connections (such as polyphase machines having more than three phases) may also be used with the present approach. It is important for operation in accordance with the present invention that the machine inductances and switched-mode rectifier be used together as a switching power converter to charge the high-voltage battery from the charging source.

Having described preferred embodiments of the invention, it will now become apparent to one of ordinary skill in the art that other embodiments incorporating their concepts may also be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A system for charging a first source having a positive and a negative terminal from a second source having a positive and a negative terminal, the system comprising:

an alternating current (ac) voltage source having an internal inductance;

a switching power converter having a first set of terminals coupled to the ac voltage source and a second set of terminals coupled to the positive and negative terminals of the first source;

a control circuit coupled to said switching power converter;

a connecting system for selectively connecting the positive terminal of the second source to the ac voltage source; and a jump charging controller coupled to said control circuit, said jump charging controller operative to enable said switching power converter to be used in conjunction with the ac voltage source inductances as a dc/dc converter to charge the first source from the second source.

2. The system of claim 1 wherein the positive terminal of the second source is coupled to the neutral point of the ac voltage source.

3. The system of claim 2 wherein the second source has a voltage level which is less than the voltage level of the first source.

4. The system of claim 3 wherein said ac voltage source is a wound-field alternator.

5. The system of claim 3 wherein said ac voltage source is a permanent magnet alternator.

6. The system of claim 1 wherein the switching power converter is a switched-mode rectifier.

7. A system for charging a battery coupled to an output of a switching power converter comprising:

an ac machine coupled to an input of the switching power converter;

a charging source having a positive terminal and a negative terminal; and connecting means for selectively connecting the positive terminal of the charging source to said ac machine.

8. The system of claim 7 wherein said connecting means is coupled to a neutral point of said ac machine.

9. The system of claim 7 wherein the negative terminals of the charging source and the battery are connected to system ground.

10. The system of claim 7 wherein said charging source has a voltage level which is less than the voltage level of the battery.

11. A method for charging a battery at an output of a switched-mode rectifier comprising the steps of:

(a) connecting a positive terminal of a charging source to an ac machine;

(b) connecting a negative terminal of the charging source to system ground;

(c) increasing a current in the ac machine to draw a first amount of energy from the charging source;

(d) storing the first amount of energy in inductive elements of the ac machine; and (e) transferring the first amount of energy plus additional energy from the charging source to the battery.

12. The method of claim 11 wherein the step of connecting the positive terminal of the charging source to the ac machine includes the step of connecting the positive terminal of the charging source to the neutral point of the ac machine.

13. The method of claim 12 wherein the step of increasing the current in the ac machine includes the step of providing a low impedance path between output terminals of the ac machine to draw energy from the charging source.

14. The method of claim 13 wherein the step of providing a low impedance path between the output terminals of the ac machine includes the step of biasing switches in a switching power converter coupled to the ac machine into their conduction state.

15. The method of claim 14 wherein the ac machine inductances in conjunction with the switching power converter cooperate to provide a dc/dc converter to charge the battery from the charging source.

16. The method of claim 15 wherein the charging source has a voltage level which is lower than the voltage level of the battery.

17. The method of claim 16 wherein the charging source corresponds to a low-voltage battery in a vehicle in which the battery is disposed.

18. The method of claim 16 wherein the charging source corresponds to a low-voltage battery which is not in a vehicle in which the battery is disposed.

19. A system for charging a battery coupled to an output of a switching power converter from a charging source having a positive terminal and a negative terminal comprising:

an ac machine coupled to an input of the switching power converter; and connecting means for selectively connecting the positive terminal of the charging source to said ac machine, wherein said connecting means is coupled to a neutral point of said ac machine.

* * * * *

UNITED STATES PATENT AND TRADEMARK OFFICE
CERTIFICATE OF CORRECTION

PATENT NO. : 6,456,514 B1
DATED : September 24, 2002
INVENTOR(S) : David J. Perreault et al.

It is certified that error appears in the above-identified patent and that said Letters Patent is hereby corrected as shown below:

Column 1,
Line 34, delete "a lundell machine..." and replace with -- A Lundell machine --.

Column 3,
Line 49, delete "electrical system.)" and replace with -- electrical system). --

Column 6,
Line 66, delete "a f-unction" and replace with -- a function --.

Column 8,
Line 13, delete "The steps to wind of the alternator" and replace with
-- The steps to wind the alternator --.

Column 9,
Line 36, delete "is flow" and replace with -- is a flow --.
Line 51, delete "machine; and" and replace with -- machine --.
Line 52, delete "is a is a" and replace with -- is a --.

Column 11,
Line 31, delete "14 act" and replace with -- 14 acts --.

Column 13,
Line 22, delete "14A" and replace with -- 14a --.

Column 16,
Line 20, delete "deexcitation" and replace with -- de-excitation --.

Column 19,
Line 3, delete "(using a additional" and replace with -- (using an additional --.

UNITED STATES PATENT AND TRADEMARK OFFICE
CERTIFICATE OF CORRECTION

PATENT NO.   : 6,456,514 B1
DATED        : September 24, 2002
INVENTOR(S)  : David J. Perreault et al.

It is certified that error appears in the above-identified patent and that said Letters Patent is hereby corrected as shown below:

Column 28,
Line 26, delete "MOSFETS" and replace with -- MOSFETs --.
Line 36, delete "is off Before" and replace with -- is off. Before --.

Column 30,
Line 19, delete "utilized" and replace with -- utilize --.
Line 20, delete "thus alternator" and replace with -- alternator --.

Signed and Sealed this

Twenty-fifth Day of February, 2003

JAMES E. ROGAN
*Director of the United States Patent and Trademark Office*